(12) United States Patent
Lundin et al.

(10) Patent No.: US 8,256,938 B2
(45) Date of Patent: *Sep. 4, 2012

(54) METHOD AND SYSTEM FOR CONVERTING A SODIUM STREET LAMP TO AN EFFICIENT WHITE LIGHT SOURCE

(75) Inventors: Erik H. M. Lundin, Camarillo, CA (US); Frederick M. Espiau, Topanga, CA (US); Mehran Matloubian, Encino, CA (US)

(73) Assignee: Topanga Technologies, Inc., Canoga Park, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/814,389

(22) Filed: Jun. 11, 2010

(65) Prior Publication Data

US 2011/0205746 A1 Aug. 25, 2011

Related U.S. Application Data

(60) Provisional application No. 61/187,219, filed on Jun. 15, 2009.

(51) Int. Cl.
```
F21S 8/00      (2006.01)
F21S 13/10     (2006.01)
H01J 7/46      (2006.01)
H01J 19/80     (2006.01)
```
(52) U.S. Cl. ............... 362/431; 362/263; 315/39
(58) Field of Classification Search .......... 362/431, 362/254, 263; 313/153–162; 315/248, 39
See application file for complete search history.

(56) References Cited

U.S. PATENT DOCUMENTS

| | | | | |
|---|---|---|---|---|
| 4,959,584 | A | * | 9/1990 | Anderson ............... 313/160 |
| 5,136,493 | A | * | 8/1992 | Straus et al. ............ 362/373 |
| 5,798,618 | A | * | 8/1998 | van Os et al. ........... 315/248 |
| 6,419,378 | B1 | * | 7/2002 | Wedell et al. ........... 362/431 |
| 6,739,734 | B1 | * | 5/2004 | Hulgan ................... 362/243 |
| 7,276,860 | B2 | * | 10/2007 | Choi et al. .............. 315/248 |
| 7,362,056 | B2 | | 4/2008 | Espiau et al. |
| 7,364,328 | B2 | * | 4/2008 | Lee et al. ................ 362/374 |
| 7,372,209 | B2 | * | 5/2008 | Espiau et al. ............. 315/39 |
| 7,430,120 | B2 | * | 9/2008 | Lau ......................... 361/709 |
| 2006/0087257 | A1 | * | 4/2006 | Choi et al. ............... 315/248 |
| 2010/0079079 | A1 | * | 4/2010 | Hockman ................ 315/248 |
| 2010/0283605 | A1 | * | 11/2010 | Nevins ..................... 340/540 |

* cited by examiner

*Primary Examiner* — David Crowe
(74) *Attorney, Agent, or Firm* — Kilpatrick Townsend & Stockton LLP

(57) ABSTRACT

A street lamp apparatus. The apparatus has a housing having an inner region and an outer region. In a specific embodiment, the inner region forms a cavity structure. The apparatus also has a transparent cover coupled to the housing to enclose the inner region and a socket being provided within the cavity structure. The apparatus has an electrodeless plasma lamp coupled to the socket. In a specific embodiment, the apparatus has an RF power source provided between the socket and an AC power source. In a specific embodiment, the RF power source is configured to generate a frequency of about 1 GHz and less to cause a fill material in the plasma lamp to discharge. In a specific embodiment, the apparatus has a heat sink provided form one or more portions of the housing. In a specific embodiment, the one or more portions of the housing is thermally coupled to the RF power source.

14 Claims, 21 Drawing Sheets

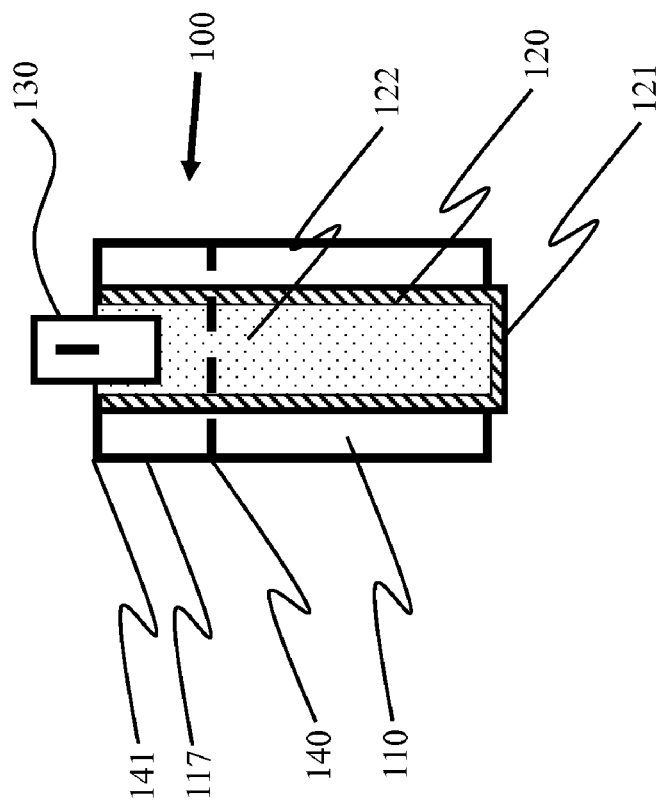
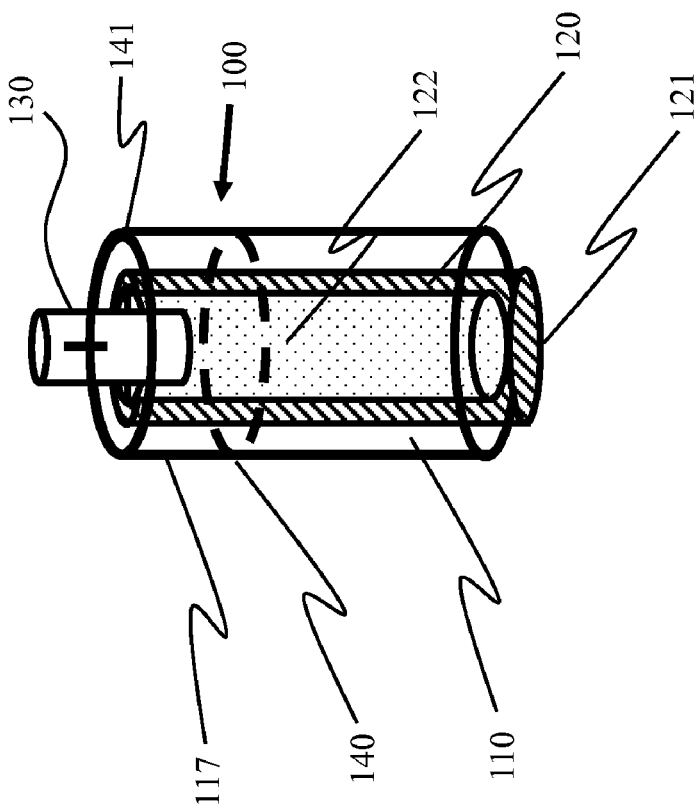

METHOD AND SYSTEM FOR CONVERTING A SODIUM STREET LAMP TO AN EFFICIENT WHITE LIGHT SOURCE

CROSS-REFERENCE TO RELATED APPLICATION

The present application claims priority to U.S. Provisional Patent Application No. 61/187,219, filed Jun. 15, 2009, which is incorporated by reference herein for all purposes.

BACKGROUND OF THE INVENTION

The present invention relates generally to lighting techniques. In particular, the present invention provides a method and device using an electrodeless plasma lighting device having one of a plurality of base configurations. More particularly, the present invention provides a method and resulting system for retrofitting an electrodeless plasma lighting device onto a street lamp or other configurations. Merely by way of example, such configurations can include at least a warehouse lamp, stadium lamp, street lamp, parking-lot lamp, lamps in small and large buildings, and other applications that can be retrofitted, and the like.

From the early days, human beings have used a variety of techniques for lighting. Early humans relied on fire to light caves during hours of darkness. Fire often consumed wood for fuel. Wood fuel was soon replaced by candles, which were derived from oils and fats. Candles were then replaced, at least in part by lamps. Certain lamps were fueled by oil or other sources of energy. Gas lamps were popular and still remain important for outdoor activities such as camping. In the late 1800s, Thomas Edison, who is one of the greatest inventors of all time, conceived the incandescent lamp, which uses a tungsten filament within a bulb, coupled to a pair of electrodes. Many conventional buildings and homes still use the incandescent lamp, commonly called the Edison bulb. Although highly successful, the Edison bulb consumed much energy and was generally inefficient.

Fluorescent lighting replaced incandescent lamps for certain applications. Fluorescent lamps generally consist of a tube containing a gaseous material, which is coupled to a pair of electrodes. The electrodes are coupled to an electronic ballast, which helps ignite the discharge from the fluorescent lighting. Conventional building structures often use fluorescent lighting, rather than the incandescent counterpart. Fluorescent lighting is much more efficient than incandescent lighting, but often has a higher initial cost.

Shuji Nakamura pioneered the efficient blue light emitting diode, which is a solid state lamp. The blue light emitting diode forms a basis for the white solid state light, which is often a blue light emitting diode within a bulb coated with a yellow phosphor material. Blue light excites the phosphor material to emit white light. The blue light emitting diode has revolutionized the lighting industry to replace traditional lighting for homes, buildings, and other structures.

Another form of lighting is commonly called the electrodeless lamp, which can be used to discharge light for high intensity applications. Frederick M. Espiau was one of the pioneers that developed an improved electrode\less lamp. Such electrodeless lamp relied solely upon a solid ceramic resonator structure positioned against a fill enclosed in a bulb. The bulb was coupled to the resonator structure via RF feeds, which transferred power to the fill to cause it to discharge high intensity lighting. Although somewhat successful, the electrodeless lamp still had many limitations. As an example, electrode-less lamps have not been successfully deployed on a wide scale.

From the above, it is seen that improved techniques for lighting are high desired.

BRIEF SUMMARY OF THE INVENTION

According to the present invention, techniques for lighting are provided. In particular, the present invention provides a method and device using an electrodeless plasma lighting device having one of a plurality of base configurations. More particularly, the present invention provides a method and resulting system for retrofitting a plasma lighting device onto a street lamp or other configurations. Merely by way of example, such configurations can include at least a warehouse lamp, stadium lamp, street lamp, parking-lot lamp, lamps in small and large buildings, and other applications that can be retrofitted, and the like.

In a specific embodiment, the present invention provides a method for converting a low or high pressure sodium street lamp to an electrodeless plasma lamp device. The method includes providing a street lamp apparatus comprising a housing having an inner region and an outer region. In a specific embodiment, the inner region forms a cavity structure. In a specific embodiment, the present invention provides a transparent cover coupled to the housing to enclose the inner region. A socket is provided within the cavity structure. In a specific embodiment, the socket is coupled to a sodium lamp having a first terminal and a second terminal. A ballast is coupled to the first terminal and an AC power source is coupled between the ballast and the second terminal. The method includes exposing the cavity region of the housing by detaching the transparent cover and removing the sodium lamp from the socket. In a specific embodiment, the method includes decoupling the ballast from the socket and coupling an electrodeless lamp to the socket. The method includes coupling an RF power source between the socket and an AC power source and enclosing the cavity region by attaching the transparent cover.

In an alternative specific embodiment, the present invention provides a method for converting a low or high pressure sodium street lamp to an electrodeless plasma lamp device. The method includes providing a street lamp apparatus comprising a housing having an inner region and an outer region. The inner region forms a cavity structure. A transparent cover member is coupled to the housing to enclose the inner region. A socket is provided within the cavity structure. In a specific embodiment, the socket is coupled to a sodium lamp having a first terminal and a second terminal. A ballast is coupled to the first terminal and an AC power source is coupled between the ballast and the second terminal. In a specific embodiment, the present method includes exposing the cavity region of the housing and removing the sodium lamp. The method also includes decoupling or removing the ballast and coupling a plasma lamp and an rf power source into a spatial region within an inner region of the housing. The method includes coupling the AC power source to the RF power source and enclosing the cavity region to house the plasma lamp and the RF source.

In yet an alternative specific embodiment, the present invention provides a method for converting a low or high pressure sodium street lamp to an electrodeless plasma lamp device. In a specific embodiment, the method includes providing a street lamp apparatus comprising a first housing having an inner region and an outer region. In a specific embodiment, the inner region forms a cavity structure, a transparent cover is coupled to the housing to enclose the inner region, and a socket is provided within the cavity structure. In a specific embodiment, the socket is coupled to a sodium lamp having a first terminal and a second terminal, a ballast is coupled to the first terminal and an AC power source is coupled between the ballast and the second terminal. In a specific embodiment, the method includes removing the first housing from the street lamp apparatus by at least decoupling an AC power source and mechanically decoupling the housing from the street lamp apparatus. The method also includes attaching a second housing to the street lamp apparatus. In a specific embodiment, the second housing comprises a plasma lamp device coupled to a resonator structure. In a specific embodiment, the resonator structure is coupled to an RF power source. The method also includes coupling the AC power source to the RF power source and supplying the power from the AC power source to the electrodeless plasma lamp.

Still further, the present invention provides a street lamp apparatus. The apparatus has a housing having an inner region and an outer region. In a specific embodiment, the inner region forms a cavity structure. The apparatus also has a transparent cover coupled to the housing to enclose the inner region and a socket being provided within the cavity structure. The apparatus has an electrodeless plasma lamp coupled to the socket. In a specific embodiment, the apparatus has an RF power source provided between the socket and an AC power source. In a specific embodiment, the RF power source is configured to generate a frequency of about 1 GHz and less to cause a fill material in the plasma lamp to discharge. In a specific embodiment, the apparatus has a heat sink provided form one or more portions of the housing. In a specific embodiment, the one or more portions of the housing is thermally coupled to the RF power source.

Benefits are achieved over pre-existing techniques using the present invention. In a specific embodiment, the present inventions provides a method and device having configurations of input, output, and feedback coupling elements that provide for electromagnetic coupling to the bulb whose power transfer and frequency resonance characteristics that are largely independent of the conventional dielectric resonator, but can also be dependent upon conventional designs. In a preferred embodiment, the present invention provides a method and configurations with an arrangement that provides for improved manufacturability as well as design flexibility. Other embodiments may include integrated assemblies of the output coupling element and bulb that function in a complementary manner with the present coupling element configurations and related methods for street lighting applications. Still further, the present method and device provide for improved heat transfer characteristics, as well as further simplifying manufacturing and/or retrofitting of existing and new street lighting, such as lamps, and the like. In a specific embodiment, the present method and resulting structure are relatively simple and cost effective to manufacture for commercial applications. Depending upon the embodiment, one or more of these benefits may be achieved. These and other benefits may be described throughout the present specification and more particularly below.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

FIG. 8G is a perspective view of an alternate integrated bulb/output coupling-element assembly to the one in FIG. 3E comprising multiple sections including an output coupling-element, a gas-fill vessel that is the bulb, but without a top coupling-element. The output coupling-element is made out of conductively-coated dielectric material.

FIG. 8H is a side-cut view of the alternate integrated bulb/output coupling-element assembly shown in FIG. 8G comprising multiple sections including an output coupling-element, a gas-fill vessel that is the bulb, but without a top coupling-element. The output-coupling-element is made out of conductively-coated dielectric material.

DETAILED DESCRIPTION OF THE INVENTION

According to the present invention, techniques for lighting are provided. In particular, the present invention provides a method and device using an electrodeless plasma lighting device having one of a plurality of base configurations. More particularly, the present invention provides a method and resulting system for retrofitting an electrodeless plasma lighting device onto a street lamp or other configurations. Merely by way of example, such configurations can include at least warehouse lamp, stadium lamp, street lamp, parking-lot lamp, lamps in small and large buildings, and other applications that can be retrofitted, and the like.

Figure 1:
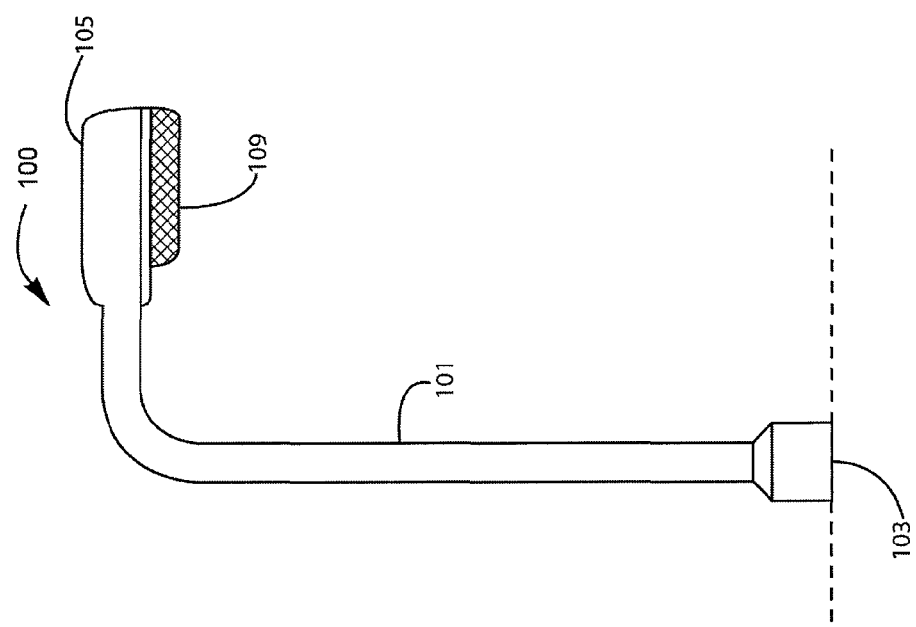
FIG. 1 is a simplified diagram of a street lamp according to an embodiment of the present invention.

FIG. 1 is a simplified diagram of a street lamp 100 according to an embodiment of the present invention. This diagram is merely an example, and should not unduly limit the scope of claims herein. One of ordinary skill in the art would recognize other variations, modifications, and alternatives. As shown, the street lamp 100 includes a support member 101, commonly called a pole or other suitable structure, such as a beam, frame, or other mounting structure. In a specific embodiment, the support member is often made of a suitable material such as a metal but can also be a polymer based material, any layered and/or composite materials, and the like. In a specific embodiment, the metal can include aluminum, steel, other suitable alloys, and the like. In a specific embodiment, the polymer based material can also be a lightweight plastic, carbon fiber based material, such as fiber glass, or other rigid structures, which can withstand environmental influences and are generally shock resistant. In a specific embodiment, the support member is secured 103 to the ground via an attachment device such as a set of bolts, or other technique secured to concrete and/or other substantially fixed structure. Also shown is housing 105 that houses reflector, lamp, ballast and lens/transparent cover and can be found throughout the present specification and more particularly below. Of course, there can be other variations, modifications, and alternatives.

Figure 2:
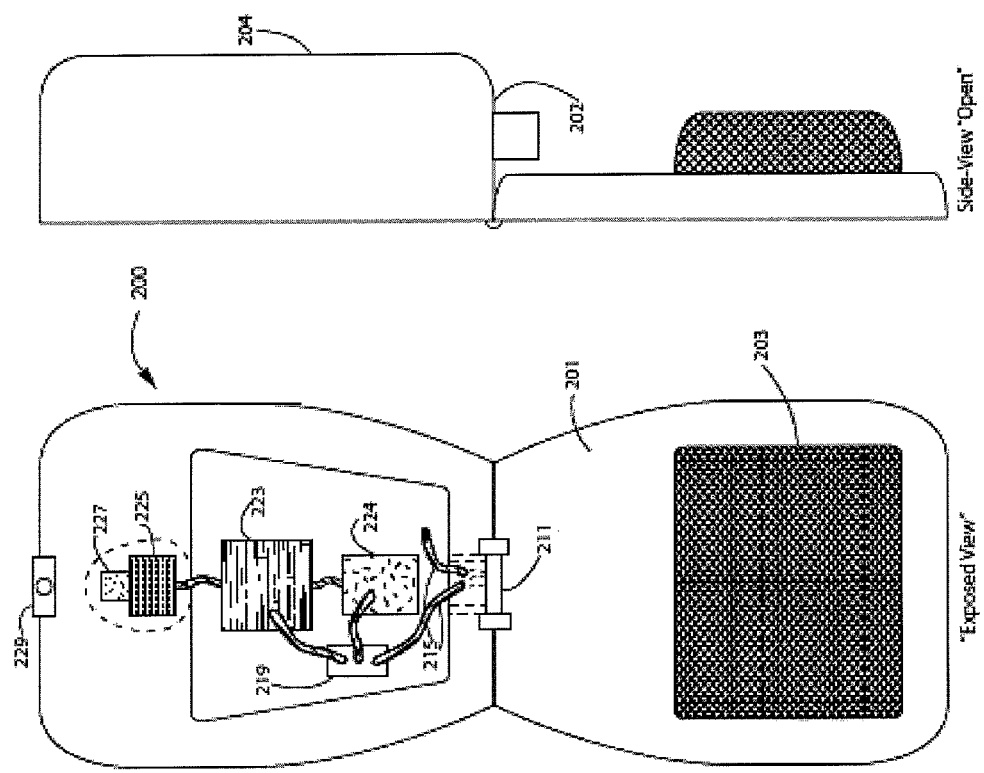
FIG. 2 is a more detailed description of a housing apparatus for a street lamp according to an embodiment of the present invention.

FIG. 2 is a more detailed description of a housing apparatus 200 for a street lamp according to an embodiment of the present invention. This diagram is merely an example, and should not unduly limit the scope of claims herein. One of ordinary skill in the art would recognize other variations, modifications, and alternatives. As shown, the housing apparatus has an inner region 204 and an outer region 202, as shown in the "Side-View" "Open" configuration. In a specific embodiment, the inner region forms a cavity structure, as shown by the "exposed view." In a specific embodiment, the housing also includes a transparent cover 203 coupled to the housing to enclose the inner region. Depending upon the embodiment, the transparent cover can be a lens, which is spatially disposed in a portion of housing 201 or other suitable structure. Of course, there can be other variations, modifications, and alternatives.

In a specific embodiment, the inner cavity structure includes various elements and/or modules. As an example, the inner region can include a socket structure provided within the cavity structure. Depending upon the embodiment, the socket structure can be from a conventional sodium lamp or other suitable structure 219 for providing an electrical connection to a pair 215 of wires or other electrical input/output device. As shown, a first wire can be coupled to a set of terminals, which couple to one or more of the modules. The second wire can be coupled to a ground plane, or other suitable input/output devices. The devices include an AC-to-DC converter 224, RF driver 223, resonator 225, and a bulb 227. Of course, there can be other variations, modifications, and alternatives. Further details of the plasma lamp, RF module, the power supply are described throughout the present specification and more particularly below.

According to a specific embodiment, a method for retrofitting a street lamp with a plasma lamp can be outlined as follows.

1. Start;
2. Provide a street lamp apparatus comprising a housing having an inner region and an outer region, a transparent cover coupled to the housing to enclose the inner region, a socket provided within a cavity structure of the inner region, a sodium lamp, a ballast, and an AC power source;
3. Expose the cavity region of the housing by detaching the transparent cover;
4. Remove the sodium lamp from the socket;
5. Decouple the ballast from the socket;
6. Couple an electrodeless lamp to the socket;
7. Couple an RF power source between the socket and an AC-to-DC power source;
8. Enclose the cavity region by attaching the transparent cover;
9. Provide power to the AC power source; and
10. Perform other steps, as desired.

The above sequence of steps provides a method according to an embodiment of the present invention. In a specific embodiment, the present invention provides a method and resulting retrofitted device using an electrodeless lamp for outdoor activities or others. Examples of plasma lamp devices are described in "Electrodeless Lamps with Externally-Grounded Probes and Improved Bulb Assemblies," in the names of Espiau, Frederick M, Buckett, Timothy J., and Matloubian, Mehran, as listed as U.S. Ser. No. 61/075,735 filed Jun. 25, 2008, commonly assigned, and hereby incorporated by reference herein. Further, the content of U.S. Ser. No. 61/075,735 was incorporated in U.S. non-provisional patent application Ser. No. 12/484,933 filed Jun. 15, 2009, now U.S. Pat. No. 7,830,092. Other examples include U.S. Pat. No. 7,362,056, among others, which are assigned to Luxim Corporation of Sunnyvale, Calif. Other alternatives can also be provided where steps are added, one or more steps are removed, or one or more steps are provided in a different sequence without departing from the scope of the claims herein.

Figure 3:
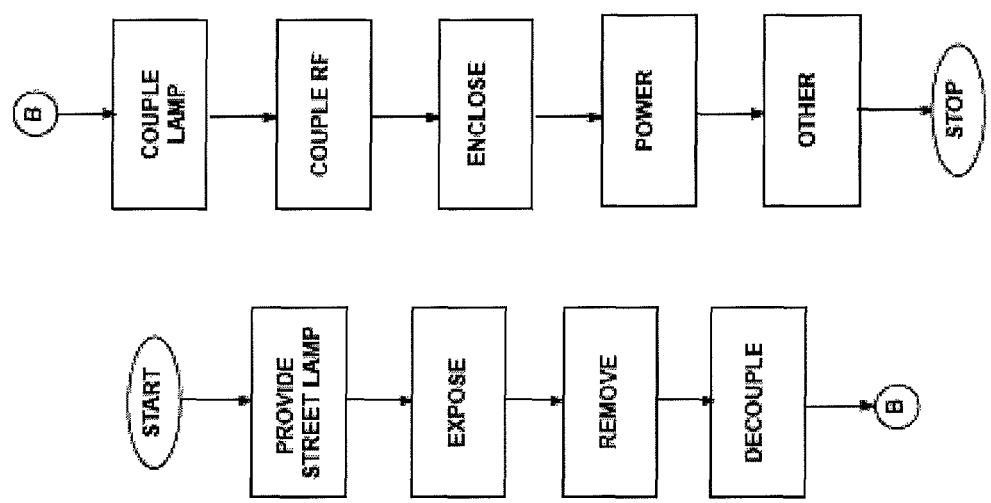
FIG. 3 is a simplified flow diagram illustrating a method for installing a plasma lamp to a street lamp according to an embodiment of the present invention.

FIG. 3 is a simplified flow diagram illustrating a method for installing a plasma lamp to a street lamp according to an embodiment of the present invention. This diagram is merely an example, and should not unduly limit the scope of claims herein. One of ordinary skill in the art would recognize other variations, modifications, and alternatives.

In yet an alternative specific embodiment, the present invention provides a method for converting a low or high pressure sodium street lamp to an electrodeless plasma lamp device, as outlined below.

1. Start;
2. Provide a street lamp apparatus comprising a first housing, a sodium lamp, a ballast, and an AC power source;
3. Remove the first housing from the street lamp apparatus by at least decoupling an AC power source;
4 Mechanically decoupling the housing from the street lamp apparatus;
5. Provide a second housing comprises a plasma lamp device coupled to a resonator structure;
6. Attach the second housing to the street lamp;
7. Couple the AC power source to the RF power source;
8. Supply power from the AC power source to the plasma lamp; and
9. Perform other steps, as desired.

The above sequence of steps provides a method according to an embodiment of the present invention. In a specific embodiment, the present invention provides a method and resulting retrofitted device using an electro-less lamp for outdoor activities or others. Other alternatives can also be provided where steps are added, one or more steps are removed, or one or more steps are provided in a different sequence without departing from the scope of the claims herein.

Figure 4:
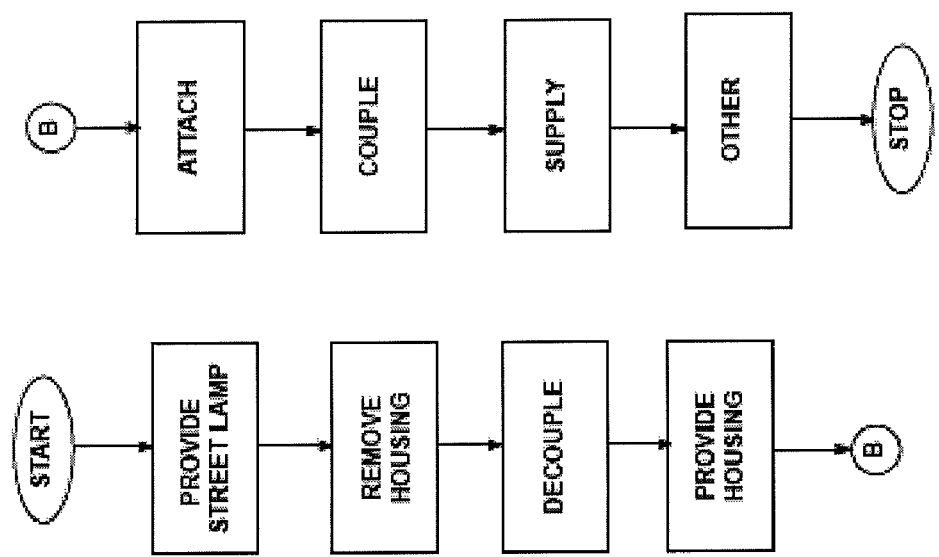
FIG. 4 is a simplified diagram of retrofitting a plasma lamp to a street lamp according to an embodiment of the present invention.

FIG. 4 is a simplified diagram of retrofitting an electrodeless plasma lamp to a street lamp according to an embodiment of the present invention. This diagram is merely an example, and should not unduly limit the scope of claims herein. One of ordinary skill in the art would recognize other variations, modifications, and alternatives.

Figure 5A:
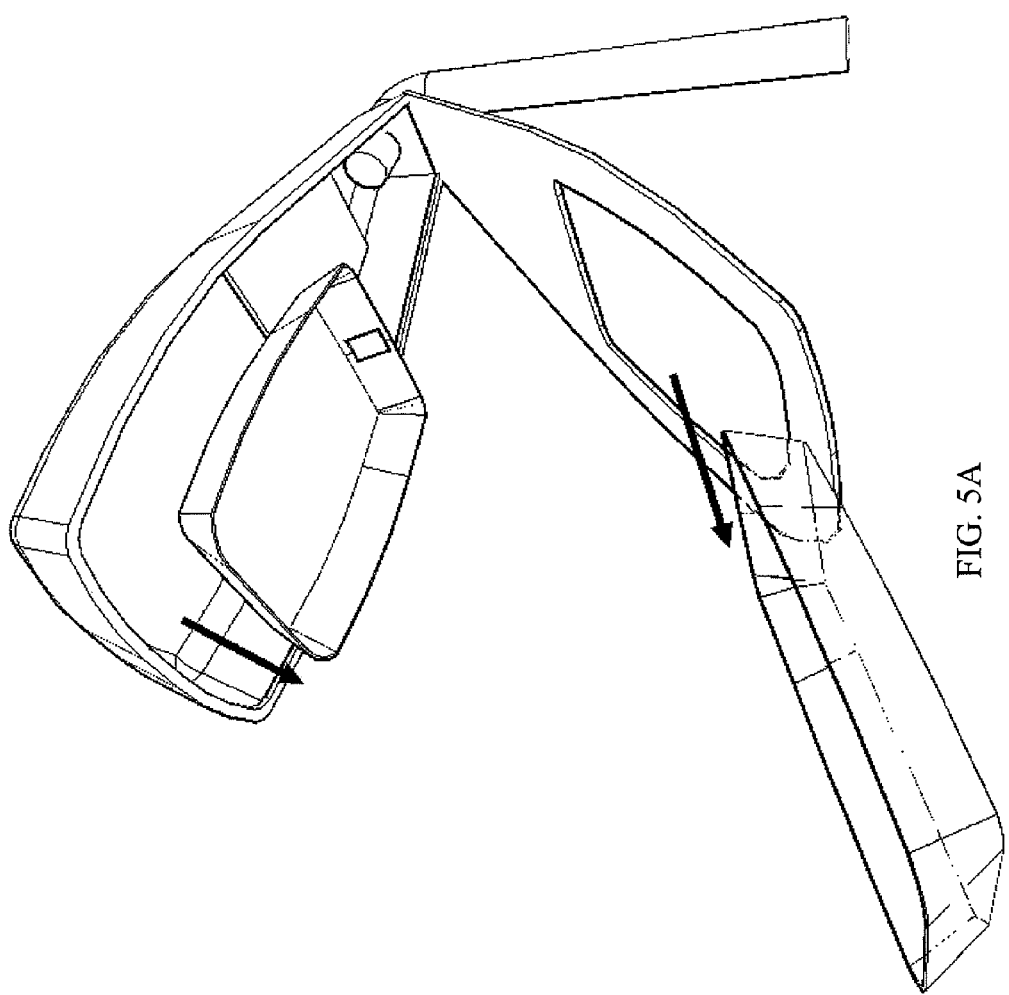
FIGS. 5A, 5B, and 5C, are simplified diagrams for retrofitting an electrodeless plasma lamp into a street lamp using an integrated light engine according to an embodiment of the present invention.
Figure 5B:
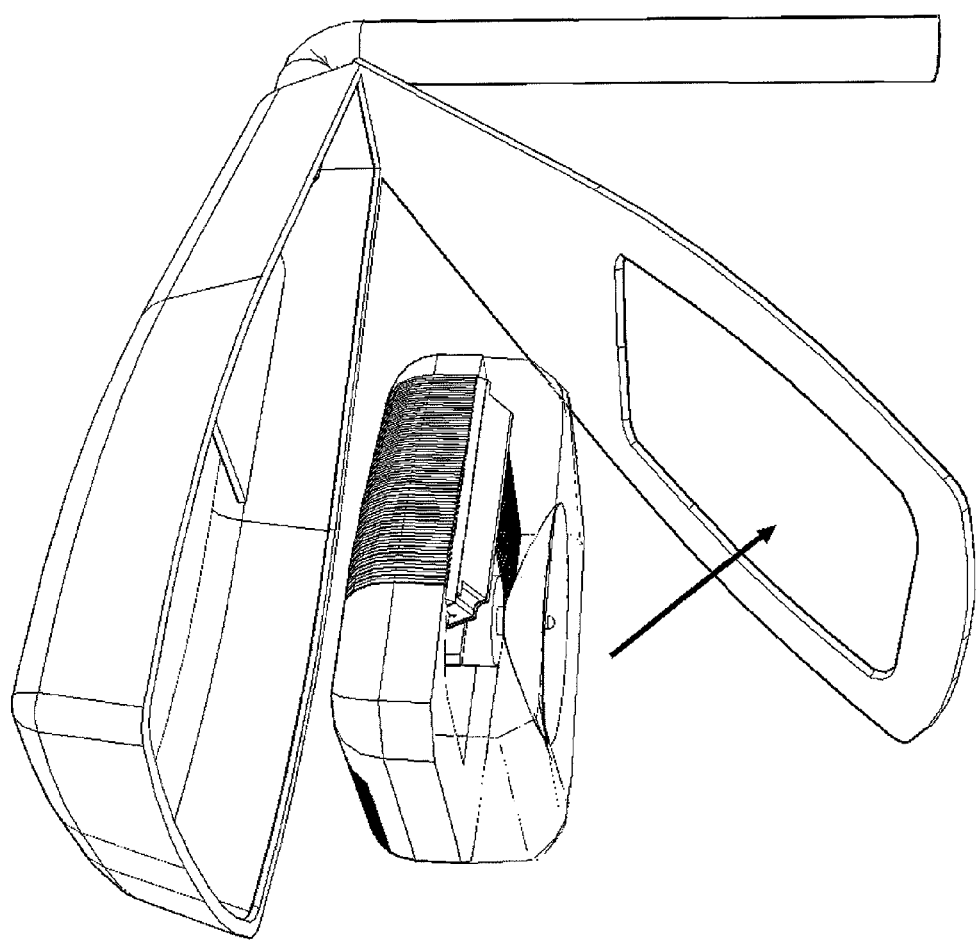
Figure 5C:
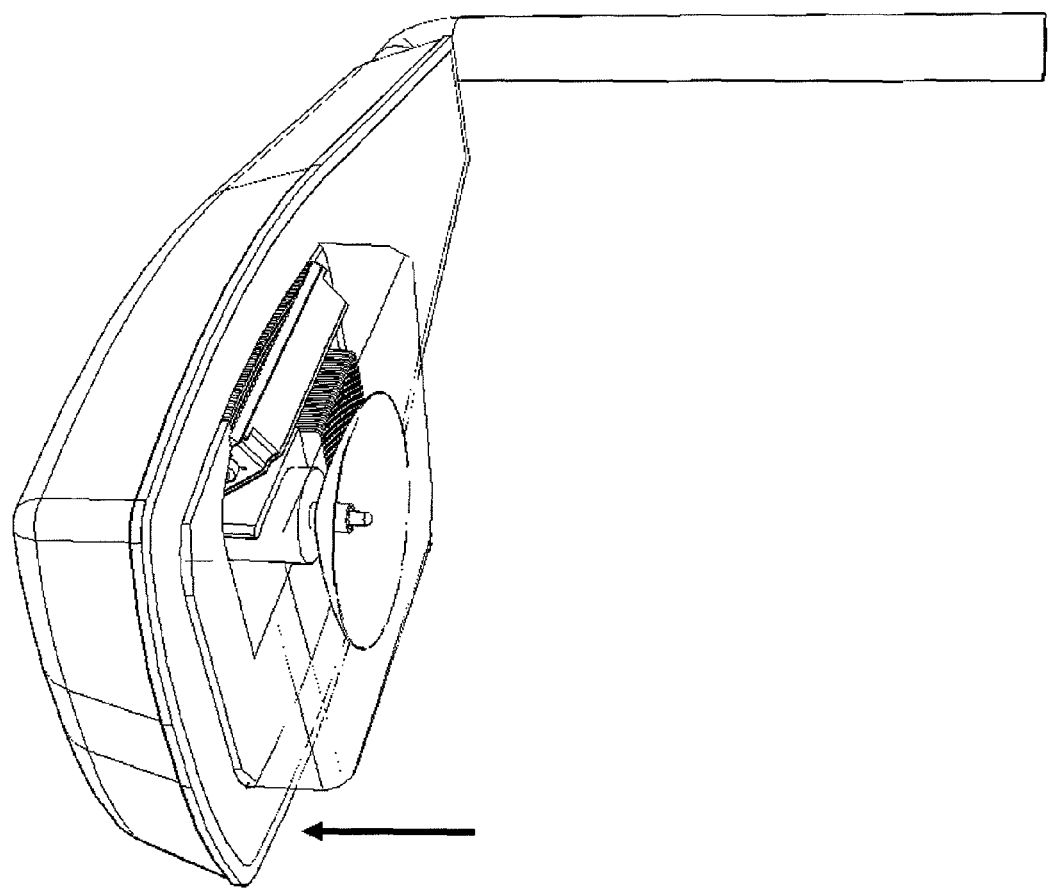

FIGS. 5A, 5B, and 5C are simplified diagrams illustrating retrofitting an electrodeless plasma lamp to a typical cobra head street lamp fixture (or luminaire) according to another embodiment of the present invention. This diagram is merely an example, which should not unduly limit the scope of the claims. One of ordinary skill in the art would recognize many variations, alternatives, and modifications. In this embodiment a self-contained electrodeless lamp light engine is used to retrofit the street lamp. The light engine includes a resonator, a bulb, a reflector, an RF driver, an AC-to-DC converter, and can also include a heat sink. The electrodeless lamp light engine is designed to fit primarily within the reflector cavity of the street lamp.

FIG. 5A is a simplified diagram illustrating a process or removing one or more components from a street lamp 500. As shown in FIG. 5A, the cover/door 502 of a street lamp 500 housing is openedThe reflector 504 and the lens/transparent cover 501 (or diffuser) of the street lamp 500 are removed. Depending on the application, ballast and/or other electrical components can also be removed.

FIG. 5B is a simplified diagram a light engine being fitted into a street lamp fixture. This diagram is merely an example, which should not unduly limit the scope of the claims. One of ordinary skill in the art would recognize many variations, alternatives, and modifications. A light engine 510 is being fitted into a street lamp fixture, which has some of the components (e.g., front over, reflector, ballast, etc.) removed to accommodate the light engine 510. In certain embodiments, the light engine includes, among other things, a electrodeless plasma lamp and driving circuits. It is to be understood that other types of energy efficient lamps can be fitted into the street lamp 502 as well. The front portion of the light engine can then fit within the lens/transparent cover portion of the street lamp cover 502 and fastened to the cover 502. In one embodiment, the light engine 510 includes an electrodeless lamp that uses DC power, and the light engine 510 includes an AC-to-DC converter. For example, the wires from the AC-to-DC converter of the light engine are connected to the power line wires of the street lamp.

FIG. 5C is a simplified diagram illustrating a light engine incorporated into a street lamp according to an embodiment of the present invention. This diagram is merely an example, which should not unduly limit the scope of the claims. One of ordinary skill in the art would recognize many variations, alternatives, and modifications. As shown in FIG. 5, the cover of the housing is then closed, thereby encloses the light engine. It is to be appreciated that use of self-contained electrodeless lamp light engines that fit within the reflector cavity of the street lamp housing fixture greatly simplifies the process of retrofitting the fixtures. For example, the dimension of the light engine is specifically design to accommodate the size of the street lamp. This approach can also be used for retrofitting other types of fixtures including parking lot fixtures. This diagram is merely an example, and should not unduly limit the scope of claims herein. One of ordinary skill in the art would recognize other variations, modifications, and alternatives.

According to alternative embodiments of the present invention, techniques directed to devices and methods for generating light with plasma lamps are provided. More particularly, the present invention provides plasma lamps driven by a radio-frequency source without the use of electrodes and related methods. Merely by way of example, such plasma lamps can be applied to applications such as stadiums, security, parking lots, military and defense, streets, large and small buildings, bridges, warehouses, agriculture, uv water treatment, architectural lighting, stage lighting, medical illumination, microscopes, projectors and displays, any combination of these, and the like.

In a specific embodiment, the plasma electrodeless lamp comprises a dielectric body substantially covered with a conductive outer coating, closely receiving two coupling elements, the first coupling element connected to the output of an RF amplifier, and the second coupling element connected to the input of an RF amplifier. The first coupling element is conductively connected (grounded) to the conductive coating of the lamp body at its top surface, while the second coupling element is not. The lamp further comprises a bulb/coupling element assembly, the assembly being grounded to the conductive coating of the lamp body at is bottom surface. Electromagnetic energy is RF-coupled between the first coupling element and the bulb-coupling element assembly, and between the bulb-coupling element assembly and the second coupling element. Electromagnetic energy is capacitively, or inductively or a combination of inductively and capacitively coupled to the bulb within the bulb-coupling element assembly. The lamp may further comprise a reflector to direct the luminous output of the bulb in the bulb-coupling element assembly. Alternatively, it may not. The lamp further comprises a ground strap to conductively connect the top of the bulb-coupling element assembly to the conductive outer coating of the lamp body. Alternatively, the ground strap may conductively connect the top of the bulb-coupling element assembly to the reflector, which in turn is conductively connected to the lamp body.

In another embodiment, the second coupling element is removed, and the first coupling element is connected to the output of an RF source, which may further comprise an RF oscillator and amplifier.

In yet another embodiment, the lamp body comprises a metallic conductive body that is partially filled with a dielectric insert.

In yet another embodiment, the lamp body comprises a metallic conductive body that is substantially hollow, with no dielectric insert.

In yet another embodiment, the bulb-coupling element assembly within the plasma electrodeless lamp comprises a single or multi-sectioned body. In a first section, a first coupling element comprising a solid conductor is closely received but not wholly enclosed by a dielectric body. A portion of the first section may be conductively coated. In a second section, a gas-fill vessel (bulb) is closely received by a dielectric body; the gas-fill vessel may or may not be wholly enclosed by the dielectric body. In a third section, a second coupling element comprising a solid conductor is closely received but not wholly enclosed by a dielectric body. A portion of the third section may be conductively coated. No DC conduction path exists between the first and third sections; electromagnetic energy is capacitively or inductively or a combination of capacitively and inductively coupled between them through the second section.

In yet another aspect, the first and second coupling elements comprise dielectric material coated with a conductive veneer, and the gas-fill vessel is partially but closely received by the center dielectric portion of the first and second electrodes. No DC conduction path exists between the first and second electrodes; electromagnetic energy is capacitively or inductively or a combination of capacitively and inductively coupled between them through gas-fill vessel.

In a specific embodiment, the present invention provides an electrodeless plasma lamp. The lamp has a conductive housing having a spatial volume defined within the conductive housing. In a specific embodiment, the spatial volume having an inner region and an outer region within the conductive housing. The lamp has a support body having an outer surface region disposed within or partially within the inner region of the spatial volume of the conductive housing and a conductive material overlying the outer surface region of the support body. The lamp has a gas filled vessel having a transparent or translucent body having an inner surface and an outer surface and a cavity formed within the inner surface. In a specific embodiment, the lamp can also include both a transparent and translucent portion. The gas filled vessel comprises a first end region and a second end region and a length defined between the first end region and the second end region. A first element is coupled to the first end region of the gas filled vessel. The first coupling element is electrically coupled to the conductive material. A second coupling element is coupled to the second end region of the gas filled vessel. An rf source coupling element is spatially disposed within the outer region of the conductive housing and within a predetermined distance from the first coupling element. The lamp has a gap (e.g., air gap) provided between the source coupling element and the first coupling element. The gap provided by the predetermined distance according to a specific embodiment. The lamp has an rf source comprising an output and optionally an input. The output of the rf source is coupled to the first coupling element through the gap and the rf source coupling element.

In an alternative specific embodiment, the present invention provides an alternative electrodeless plasma lamp. The lamp has a conductive housing having a spatial volume defined within the conductive housing. The spatial volume has an inner region and an outer region within the conductive housing. In a specific embodiment, the lamp has a support body having an outer surface region disposed within or partially within the inner region of the spatial volume of the conductive housing and a conductive material overlying the outer surface region of the support body. The lamp has a gas filled vessel having a transparent or translucent body having an inner surface and an outer surface and a cavity formed within the inner surface. The gas filled vessel comprises a first end region and a second end region and a length defined between the first end region and the second end region. In a specific embodiment, the lamp has a first element coupled to the first end region of the gas filled vessel. The first element is electrically coupled to the conductive material. The lamp has an rf source coupling element spatially disposed within the outer region of the conductive housing and within a predetermined distance from the first coupling element. In a specific embodiment, the lamp has a gap provided between the rf source coupling element and the first coupling element. The gap is formed by the predetermined distance. In a specific embodiment, the lamp has an rf source comprising an output and optionally an input. The output of the rf source is coupled to the first coupling element through the gap and the rf source coupling element.

In yet an alternative specific embodiment, the present invention provides an electrodeless plasma lamp. The lamp has a conductive housing having a spatial volume defined within the conductive housing. The spatial volume having an inner region and an outer region. The lamp has a metal support body having an outer surface region disposed within or partially within the inner region of the spatial volume of the conductive housing. The lamp has a gas filled vessel having a transparent or translucent body having an inner surface and an outer surface and a cavity formed within the inner surface. The gas filled vessel comprises a first end region and a second end region and a length defined between the first end region and the second end region. The lamp has a first element coupled to the first end region of the gas filled vessel. In a specific embodiment, the first coupling element is electrically coupled to the conductive material. The lamp also has a second element coupled to the second end region of the gas filled vessel. An rf source coupling element is spatially disposed within the outer region of the conductive housing and within a predetermined distance from the first coupling element. A gap is provided between the source coupling element and the first coupling element. The lamp has an RF source comprising an output, which is coupled to the first coupling element through the gap and the source coupling element.

Still further, the present invention provides a method of operating an electrodeless plasma lamp device. The method includes providing a plasma lamp, which can be any of the ones described herein. The method includes transferring rf energy from the rf source to the input coupling element, which is coupled to a gas filled vessel through a first coupling element and an air gap. In a preferred embodiment, the rf energy has a frequency ranging from about 100 MHz to about 20 GHz, but can be others. The method includes illuminating electromagnetic energy substantially from the length of the gas filled vessel from discharge of the gas filled vessel. Optionally, the method includes transferring thermal energy from the gas filled vessel through a conductive material of the first coupling element. In a preferred embodiment, the conductive material can be characterized as a thermal conductor and an electrical conductor.

Moreover, the present invention provides a method of operating an electrodeless plasma lamp device. The method includes providing a plasma lamp device, which can be any of the ones described herein. The method includes adjusting a predetermined distance between an rf source coupling element and a first coupling element coupled to a gas filled vessel from a first distance to a second distance to change the first gap to a second gap, which is different from the first gap. In a preferred embodiment, the predetermined distance is an air gap or other non-solid region. Of course, there can be other variations, modifications, and alternatives.

Benefits are achieved over pre-existing techniques using the present invention. In a specific embodiment, the present invention provides a method and device having configurations of input, output, and feedback coupling elements that provide for electromagnetic coupling to the bulb whose power transfer and frequency resonance characteristics that are largely independent of the conventional dielectric resonator. In a preferred embodiment, the present invention provides a method and configurations with an arrangement that provides for improved manufacturability as well as design flexibility. Other embodiments may include integrated assemblies of the output coupling element and bulb that function in a complementary manner with the present coupling element configurations and related methods. Still further, the present method and device provide for improved heat transfer characteristics, as well as further simplifying manufacturing. In a specific embodiment, the present method and resulting structure are relatively simple and cost effective to manufacture for commercial applications. Depending upon the embodiment, one or more of these benefits may be achieved.

Figure 6A:
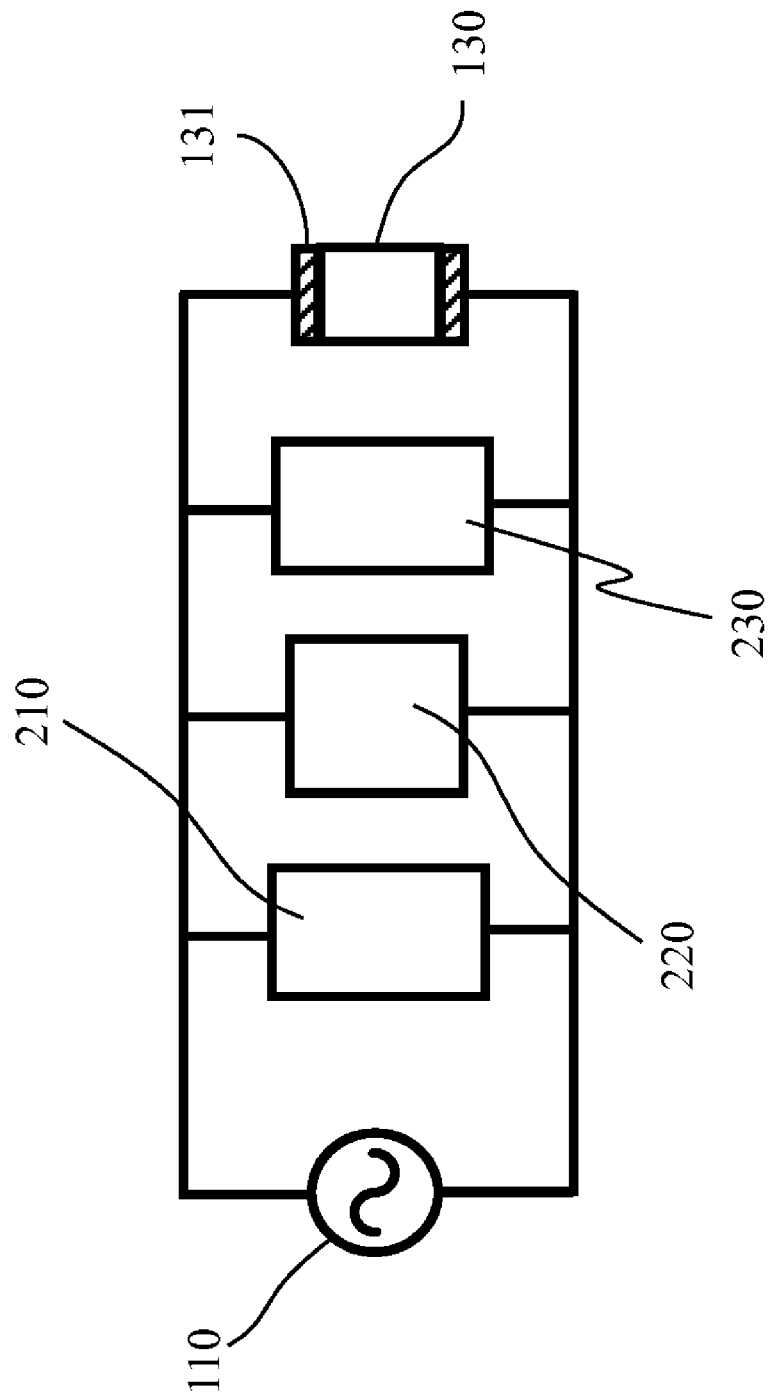
FIG. 6A is a generalized schematic of a gas-fill vessel being driven by an RF source, and capacitively coupled to the source; to optimize lamp efficiency and light output, a plurality of impedance matching networks are present between the RF source and the resonator and between the resonator and gas-fill vessel according to an embodiment of the present invention.

FIG. 6A illustrates a general schematic for efficient energy transfer from RF source 110 to gas fill vessel 130. This diagram is merely an example, which should not unduly limit the scope of the claims herein. One of ordinary skill in the art would recognize other variations, modifications, and alternatives. Energy from the RF source is directed to an impedance matching network 210 that enables the effective transfer of energy from RF source to resonating structure 220. An example of such impedance matching network is an E-field or H-field coupling element, but can be others. Another impedance matching network 230, in turn, enables efficient energy transfer from resonator to gas fill vessel 130 according to an embodiment of the present invention. An example of the impedance matching network is an E-field or H-field coupling element. Of course, there can be other variations, modifications, and alternatives.

In a specific embodiment, the gas filled vessel is made of a suitable material such as quartz or other transparent or translucent material. The gas filled vessel is filled with an inert gas such as Argon and a fluorophor such as Mercury, Sodium, Dysprosium, Sulfur or a metal halide salt such as Indium Bromide, Scandium Bromide, or Cesium Iodide (or it can simultaneously contain multiple fluorophors). Mercury, Thalium Iodide, and Indium Bromide according to a specific embodiment. The gas filled vessel can also includes a metal halide, or other metal pieces that will discharge electromagnetic radiation according to a specific embodiment. Of course, there can be other variations, modifications, and alternatives.

In a specific embodiment, a capacitive coupling structure 131 is used to deliver RF energy to the gas fill within the bulb 130. As is well known, a capacitive coupler typically comprises two electrodes of finite extent enclosing a volume and couples energy primarily using at least Electric fields (E-fields). As can be appreciated by one of ordinary skill in the art, the impedance matching networks 210 and 230 and the resonating structure 220, as depicted in schematic form here, can be interpreted as equivalent-circuit models of the distributed electromagnetic coupling between the RF source and the capacitive coupling structure. The use of impedance matching networks also allows the source to have an impedance other than 50 ohm; this may provide an advantage with respect to RF source performance in the form of reduced heating or power consumption from the RF source. Lowering power consumption and losses from the RF source would enable a greater efficiency for the lamp as a whole. As can also be appreciated by one of ordinary skill in the art, the impedance matching networks 210 and 230 are not necessarily identical.

Figure 6B:
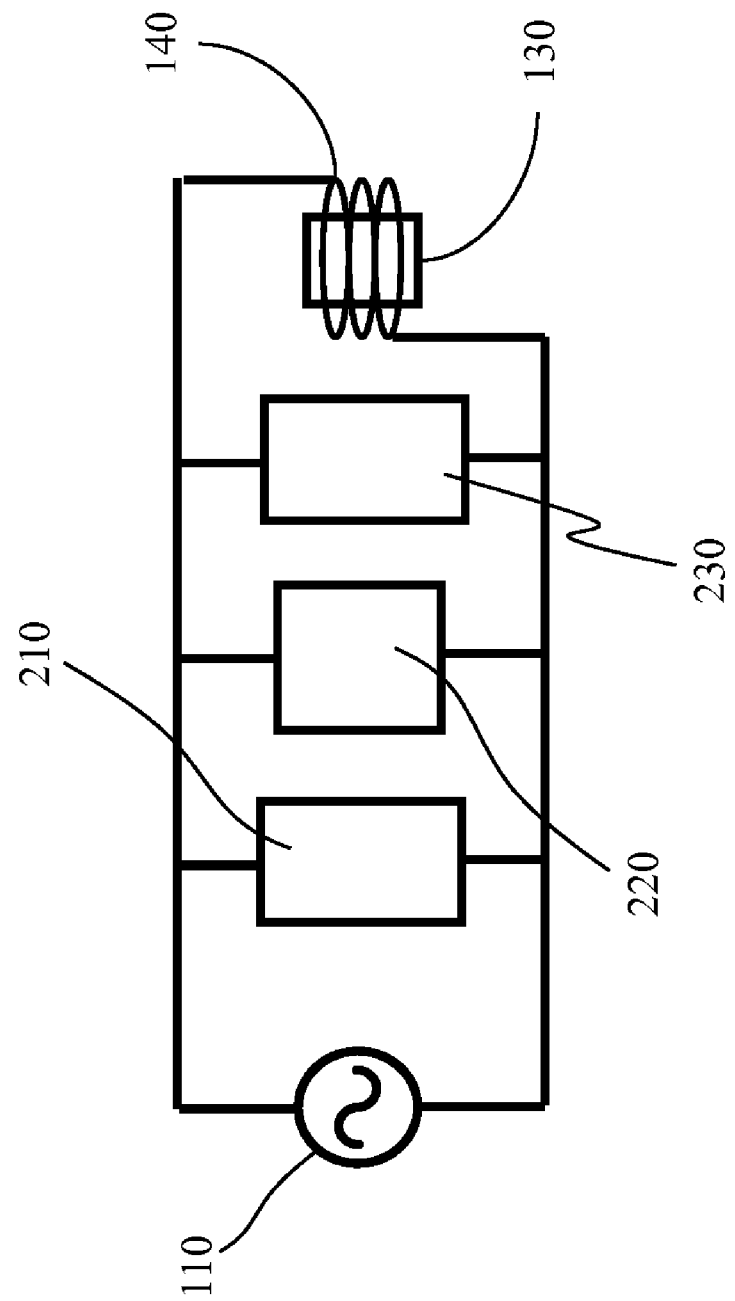
FIG. 6B is a generalized schematic of a gas-fill vessel being driven by an RF source, and inductively coupled to the source; to optimize lamp efficiency and light output, a plurality of impedance matching networks are present between the RF source and the resonator and between the resonator and gas-fill vessel according to an embodiment of the present invention.

FIG. 6B illustrates a general schematic for efficient energy transfer from RF source 110 to gas fill vessel 130. This diagram is merely an example, which should not unduly limit the scope of the claims herein. One of ordinary skill in the art would recognize other variations, modifications, and alternatives. Energy from the RF source is directed to an impedance matching network 210 that enables the effective transfer of energy from RF source to resonating structure 220. Another impedance matching network 230, in turn, enables efficient energy transfer from resonator to gas fill vessel 130. An inductive coupling structure 140 is used to deliver RF energy to the gas fill within the bulb 130. As is well known, an inductive coupler typically comprises a wire or a coil-like wire of finite extent and couples energy primarily using magnetic fields (H-fields). As can be appreciated by one of ordinary skill in the art, the impedance matching networks 210 and 230 and the resonating structure 220, as depicted in schematic form here, can be interpreted as equivalent-circuit models of the distributed electromagnetic coupling between the RF source and the inductive coupling structure. The use of impedance matching networks also allows the source to have an impedance other than 50 ohm; this may provide an advantage with respect to RF source performance in the form of reduced heating or power consumption from the RF source. Lowering power consumption and losses from the RF source would enable a greater efficiency for the lamp as a whole. As can also be appreciated by one of ordinary skill in the art, the impedance matching networks 210 and 230 are not necessarily identical.

Figure 7A:
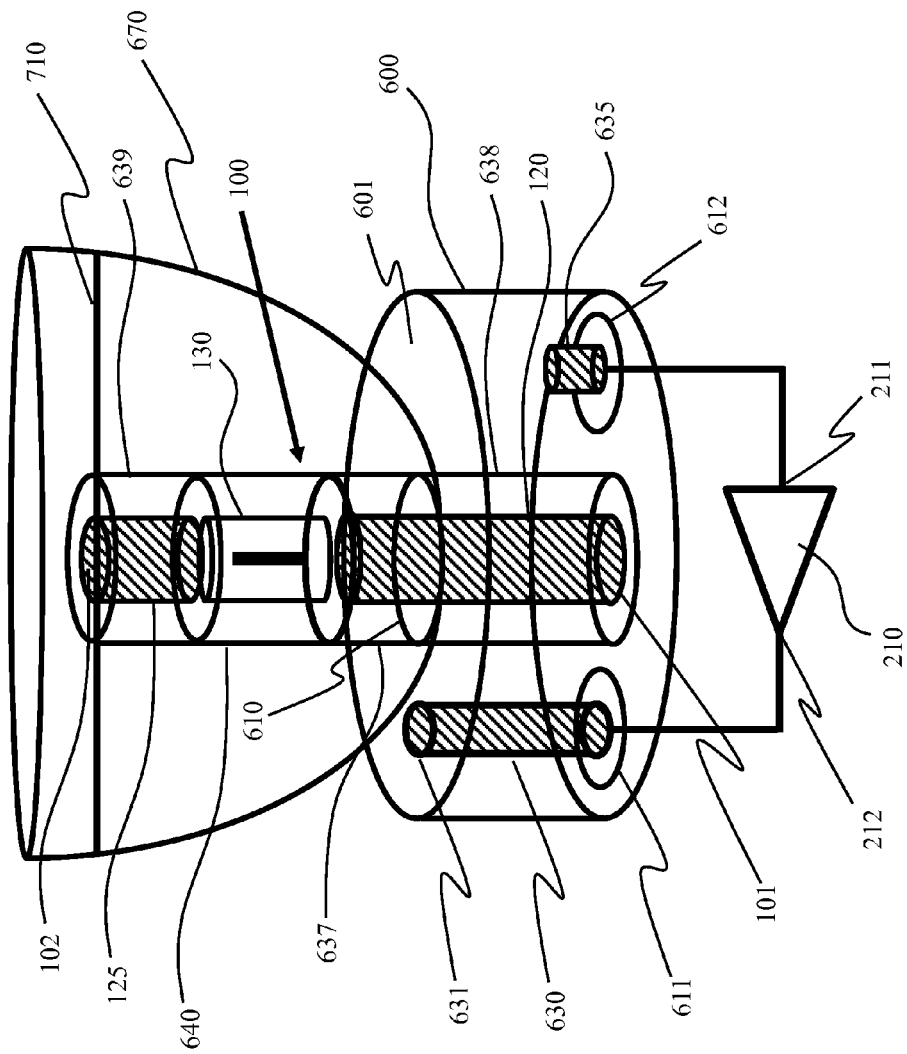
FIG. 7A is a simplified perspective view of an external resonator electrodeless lamp, comprising a lamp body, input and feedback coupling elements, an integrated bulb/output coupling element assembly, an external reflector, and an external RF amplifier according to an embodiment of the present invention. The external RF amplifier is connected in a positive feedback configuration that sustains oscillation, which couples energy to the bulb. The resonant characteristics of the coupling between the input and output coupling elements provide for frequency-selective oscillation in the feedback loop.

FIG. 7A is a perspective view of an electrodeless lamp, employing a lamp body 600, whose outer surface 601 is electrically conductive and is connected to ground. This diagram is merely an example, which should not unduly limit the scope of the claims herein. One of ordinary skill in the art would recognize other variations, modifications, and alternatives. A cylindrical lamp body is depicted, but rectangular or other shapes may be used. This conductivity may be achieved through the application of a conductive veneer, or through the choice of a conductive material. An example embodiment of conductive veneer is silver paint or alternatively the lamp body can be made from sheet of electrically conductive material such as aluminum. An integrated bulb/output coupling-element assembly 100 is closely received by the lamp body 600 through opening 610. The bulb/output coupling-element assembly 100 contains the bulb 130, which is a gas-fill vessel that ultimately produces the luminous output.

One aspect of the invention is that the bottom of the assembly 100, output coupling-element 120, is grounded to the body 600 and its conductive surface 601 at plane 101. The luminous output from the bulb is collected and directed by an external reflector 670, which is either electrically conductive or if it is made from a dielectric material has an electrically conductive backing, and which is attached to and in electrical contact with the body 600. Another aspect of the invention is that the top of the assembly 100, top coupling-element 125, is grounded to the body 600 at plane 102 via the ground strap 710 and the reflector 670. Alternatively, the reflector 670 may not exist, and the ground strap makes direct electrical contact with the body 600. Reflector 670 is depicted as parabolic in shape with bulb 130 positioned near its focus. Those of ordinary skill in the art will recognize that a wide variety of possible reflector shapes can be designed to satisfy beam-direction requirements. In a specific embodiment, the shapes can be conical, convex, concave, trapezoidal, pyramidal, or any combination of these, and the like. The shorter feedback E-field coupling-element 635 couples a small amount of RF energy from the bulb/output coupling-element assembly 100 and provides feedback to the RF amplifier input 211 of RF amplifier 210. Feedback coupling-element 635 is closely received by the lamp body 600 through opening 612, and as such is not in direct DC electrical contact with the conductive surface 601 of the lamp body. The input coupling-element 630 is conductively connected with RF amplifier output 212. Input coupling-element 630 is closely received by the lamp body 600 through opening 611, and as such is not in direct DC electrical contact with the conductive surface 601 of the lamp body. However, it is another key aspect of the invention that the top of the input coupling-element is grounded to the body 600 and its conductive surface 601 at plane 631.

RF power is primarily inductively coupled strongly from the input coupling-element 630 to the bulb/output coupling-element assembly 100 through physical proximity, their relative lengths, and the relative arrangement of their ground planes. Surface 637 of bulb/output coupling-element assembly is covered with an electrically conductive veneer or an electrically conductive material and is connected to the body 600 and its conductive surface 601. The other surfaces of the bulb/output coupling-element assembly including surfaces 638, 639, and 640 are not covered with a conductive layer. In addition surface 640 is optically transparent or translucent. The coupling between input coupling-element 630 and output coupling-element 120 and lamp assembly 100 is found through electromagnetic simulation, and through direct measurement, to be highly frequency selective and to be primarily inductive. This frequency selectivity provides for a resonant oscillator in the circuit comprising the input coupling-element 630, the bulb/output coupling-element assembly 100, the feedback coupling-element 635, and the amplifier 210.

One of ordinary skill in the art will recognize that the resonant oscillator is the equivalent of the RF source 110 depicted schematically in FIG. 6A and FIG. 6B. A significant advantage of the invention is that the resonant frequency is strongly dependent on the relative lengths of the input and output coupling-elements, and is moreover very weakly dependent on the dimensions or dielectric properties of the lamp body 600 itself. This permits the use of a compact lamp body whose natural resonant frequency may be much higher than the actual frequency of operation. In one example embodiment, the bottom of the lamp body 600 may consist of a hollow aluminum cylinder with a 1.5" diameter, and a height of 0.75". The fundamental resonant frequency of such an air cavity resonator is approximately 4 GHz but by using the design described above for the input coupling-element and the output coupling-element and by adjusting the length of the output coupling-element the overall resonant frequency of the lamp assembly can be reduced to 900 MHz or no greater than about 900 MHz in a specific embodiment. Another significant advantage of the invention is that the RF power coupled to the bulb 130 is strongly dependent on the physical separation between the input coupling-element 630 and the output coupling-element 120 within the bulb/output coupling-element assembly 100. This permits fine tuning, at assembly time, of the brightness output of a lamp which is comprised of components with relaxed dimensional tolerances. Another significant advantage of the invention is that the input coupling-element 630 and the bulb/output coupling-element assembly 100 are respectively grounded at planes 631 and 101, which are coincident with the outer surface of the body 600. This eliminates the need to fine-tune their depth of insertion into the lamp body—as well as any sensitivity of the RF coupling between them to that depth—simplifying lamp manufacture, as well as improving consistency in lamp brightness yield.

Figure 7B:
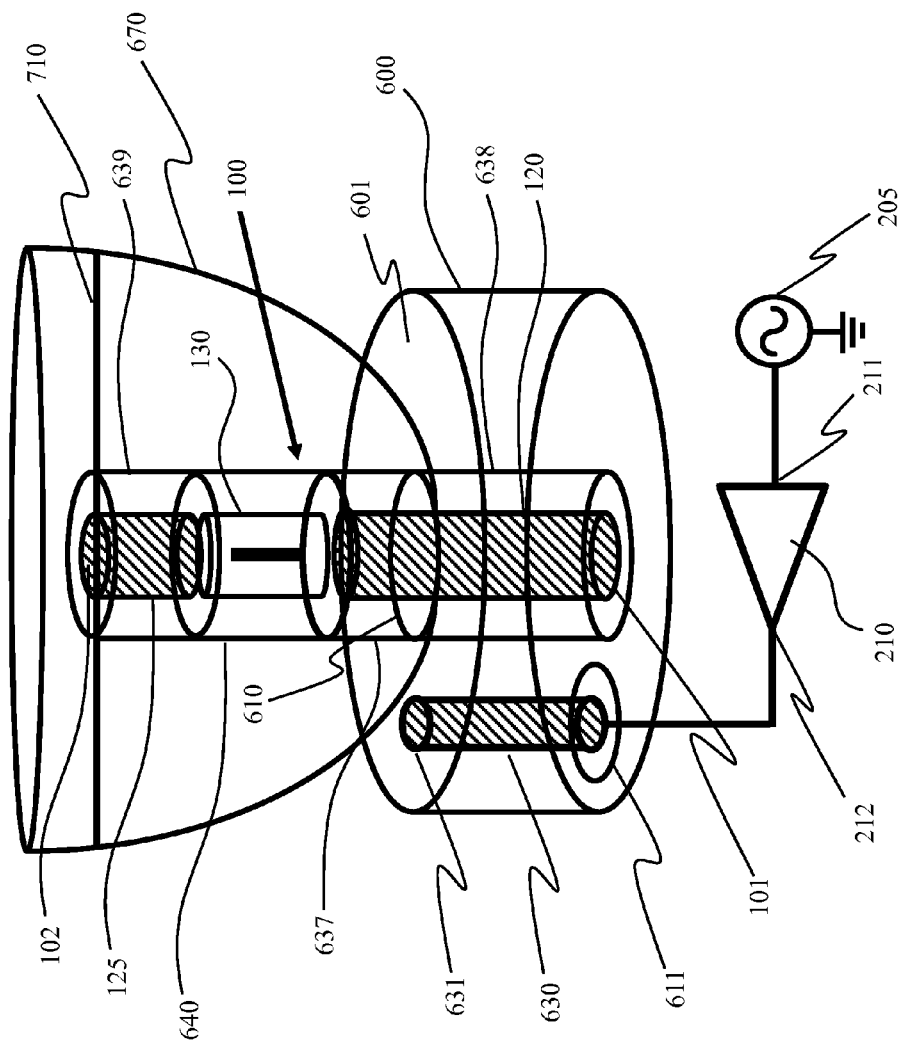
FIG. 7B is a simplified perspective view of an alternate external resonator electrodeless lamp, comprising a lamp body, input coupling element, an integrated bulb/output coupling element assembly, an external reflector, and an external RF source that may comprise an oscillator and an amplifier according to an embodiment of the present invention.

FIG. 7B is a perspective view of an electrodeless lamp that differs from that shown in FIG. 7A only in its RF source, which is not a distributed oscillator circuit, but rather a separate oscillator 205 conductively connected with RF amplifier input 211 of the RF amplifier 210. RF amplifier output 212 is conductively connected with input coupling-element 630, which delivers RF power to the lamp/output coupling-element assembly 100. The resonant characteristics of the coupling between the input coupling-element 630 and the output coupling-element in the bulb/output coupling-element assembly 100 are frequency-matched to the RF source to optimize RF power transfer. Of course, there can be other variations, modifications, and alternatives.

Figure 7C:
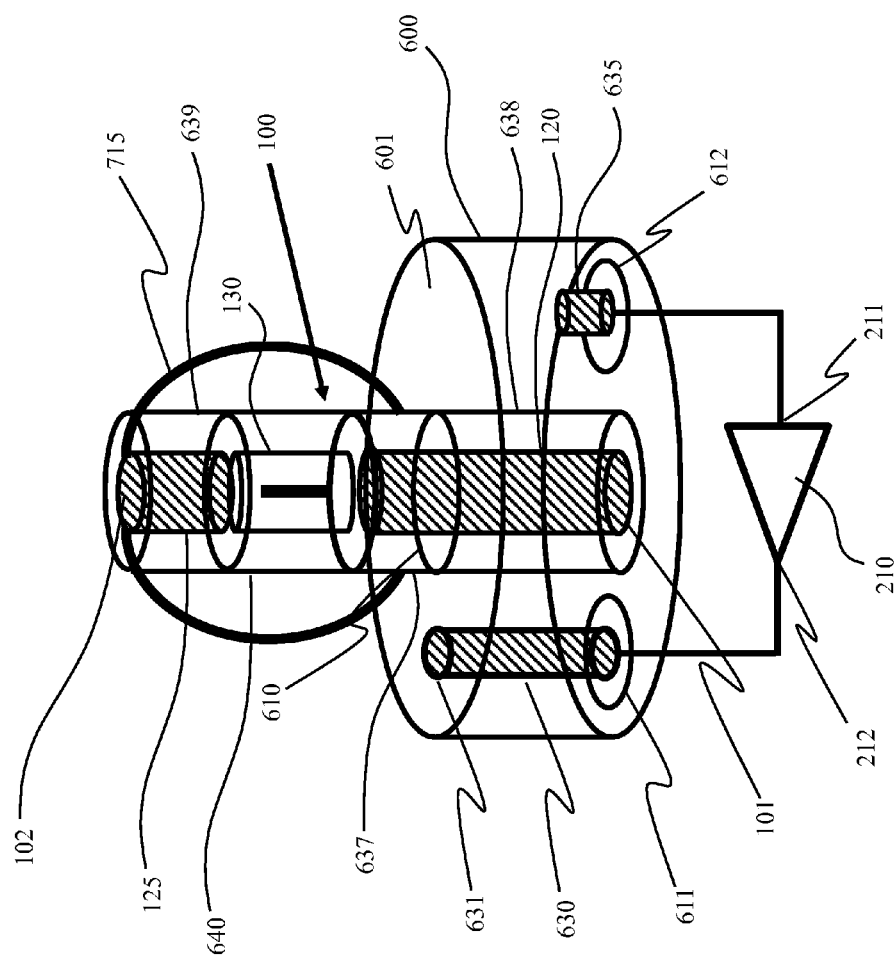
FIG. 7C is a simplified perspective view of an alternate external resonator electrodeless lamp, comprising a lamp body, input and feedback coupling elements, an integrated bulb/output coupling element assembly, and an external RF amplifier according to an embodiment of the present invention. The external RF amplifier is connected in a positive feedback configuration that sustains oscillation, which couples energy to the bulb. The resonant characteristics of the coupling between the input and output coupling elements provide for frequency-selective oscillation in the feedback loop.

FIG. 7C is a perspective view of an electrodeless lamp that is similar to the electrodeless lamp shown in FIG. 2A except that it does not have a reflector 670. The top coupling-element 125 in the bulb assembly is directly connected to the lamp body 600 using ground straps 715. This diagram is merely an example, which should not unduly limit the scope of the claims herein. One of ordinary skill in the art would recognize other variations, modifications, and alternatives FIG. 8A is a perspective view of an integrated bulb/output coupling-element assembly 100 which is the same as assembly 100 depicted in FIGS. 2A, 2B, and 2C. This diagram is merely an example, which should not unduly limit the scope of the claims herein. One of ordinary skill in the art would recognize other variations, modifications, and alternatives. The assembly comprises a lower section 110, a mid-section 111, and upper section 112. Alternatively, these sections may not be physically separate. The lower section 110 is bored to closely receive output coupling-element 120, which is a solid conductor. Coupling-element 120 protrudes from the lower section 110 at plane 121. It is a key aspect of this invention that coupling-element 120 makes ground contact at plane 121 with the lamp body 600 depicted in FIGS. 7A, 7B, and 7C. The mid-section 111 is hollowed to closely receive the bulb 130, which is the gas-fill vessel that ultimately produces the lamp's luminous output. The gas-fill vessel contains an inert gas such as Argon and a fluorophor such as Mercury, Sodium, Sulfur or a metal halide salt such as Indium Bromide or Cesium Iodide (or it can simultaneously contain multiple fluorophors). Alternatively, the mid-section 111 is hollowed, with the resulting cavity forming the volume of the bulb 130, making the two an integrated unit. The mid-section 111 can be attached to the lower section 110 and upper section 112 using high temperature adhesive. The upper section 112 is bored to closely receive top electrode 125, which is a solid conductor. Top electrode 125 protrudes from upper section 112 at plane 126. It is a key aspect of this invention that the top coupling-element 125 makes ground contact at plane 126 with the lamp body 600, as depicted in FIGS. 7A, 7B, and 7C. This is through the ground strap 710 and the reflector body 670 or ground strap 715. Overall, RF energy is coupled capacitively, or inductively, or a combination of inductively and capacitively, by the output coupling-element 120 and top coupling-element 125 to the bulb 130 which is made from quartz, translucent alumina, or other similar material, ionizing the inert gas and vaporizing the fluorophor resulting in intense light 115 emitted from the lamp.

Figure 9:
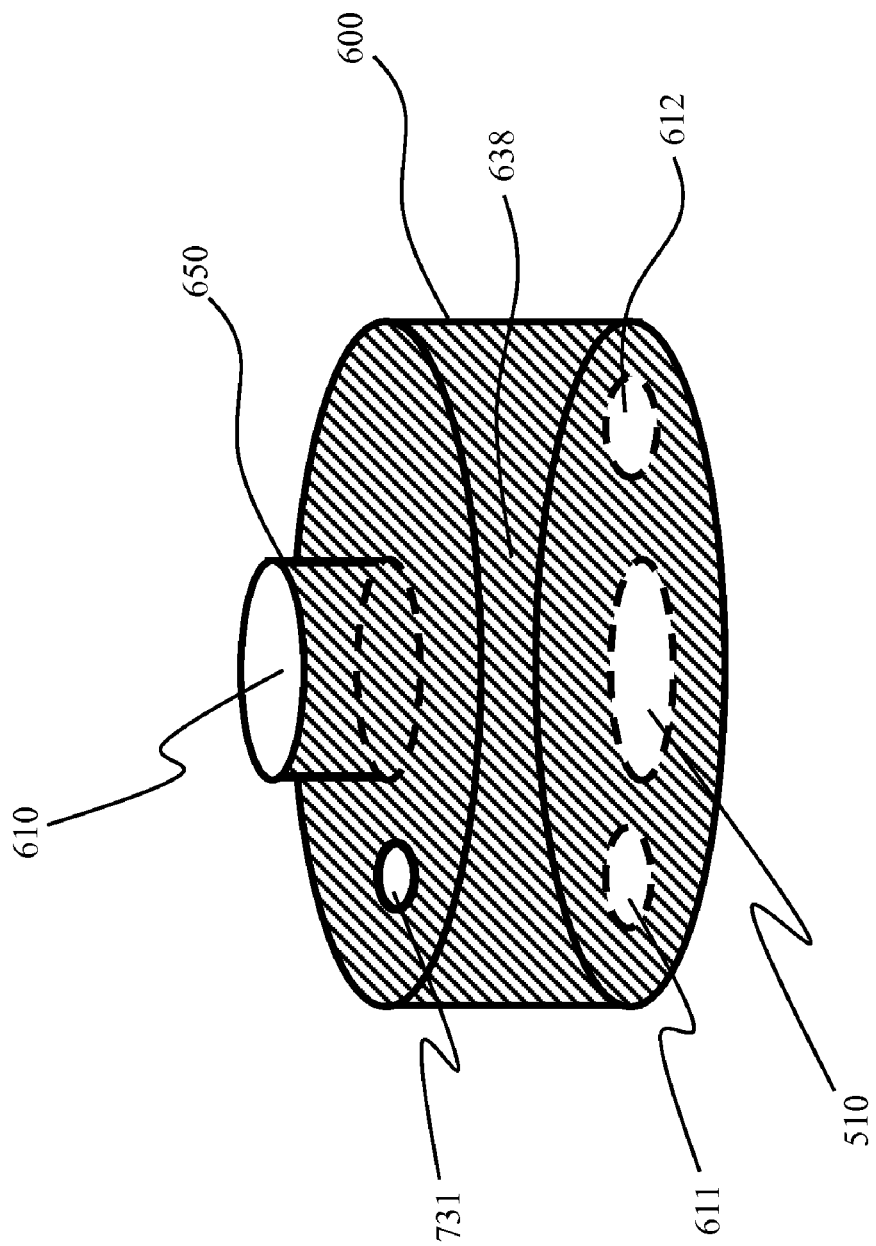
FIG. 9 is a simplified perspective view of the lamp body/metallic enclosure of the lamp shown in FIGS. 7A, 7B, and 7C according to an embodiment of the present invention. The hollow conductive lamp body receives the integrated bulb/output coupling-element assembly as well as the input coupling-element and the feedback coupling-element.

Sections 110, 111, and 112 can all be made from the same material or from different materials. Section 111 has to be transparent to visible light and have a high melting point such as quartz or translucent alumina. Sections 110 and 112 can be made from transparent (quartz or translucent alumina) or opaque materials (alumina) but they have to have low loss at RF frequencies. In the case that the same material is used for all three sections the assembly can be made from a single piece of material such as a hollow tube of quartz or translucent alumina. The upper section 112 may be coated with a conductive veneer 116 whose purpose is to shield electromagnetic radiation from the top-electrode 125. The lower section 110 may be partially coated with a conductive veneer 117 whose purpose is to shield electromagnetic radiation from the output coupling-element 120. The partial coating would extend to the portion of the lower section 110 that protrudes from the lamp body 600, as depicted in FIGS. 7A, 7B, and 7C and does not overlap with input coupling-element 630. The plane dividing that portion that protrudes from the lamp body from that portion that does not being depicted schematically by dashed line 140. An example embodiment of conductive veneers 116 and 117 is silver paint. Alternatively, instead of conductive veneers portion of the lower section 110 can be covered by a metal ring 650 as part of the extension of lamp body 600 as depicted in FIG. 9. The outer surface of the mid section 111 is not coated.

Figure 8B:
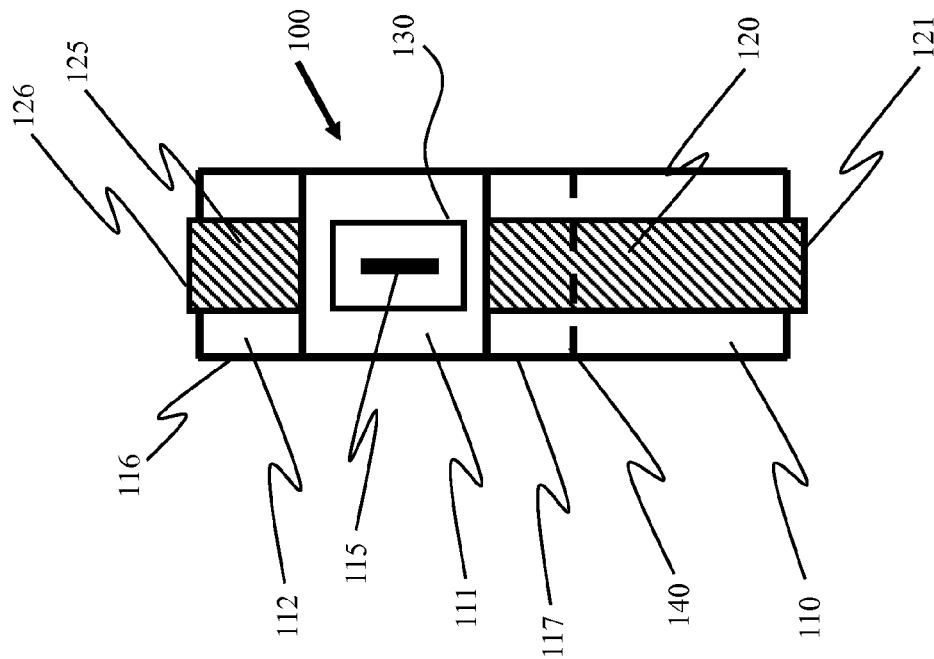
FIG. 8B is a simplified side-cut view of the integrated bulb/output coupling-element assembly shown in FIG. 8A comprising multiple sections including an output coupling-element, a gas-fill vessel that is the bulb, and a top coupling-element according to an embodiment of the present invention. The output coupling-element and top coupling-element are solid electrical conductors.
Figure 8A:
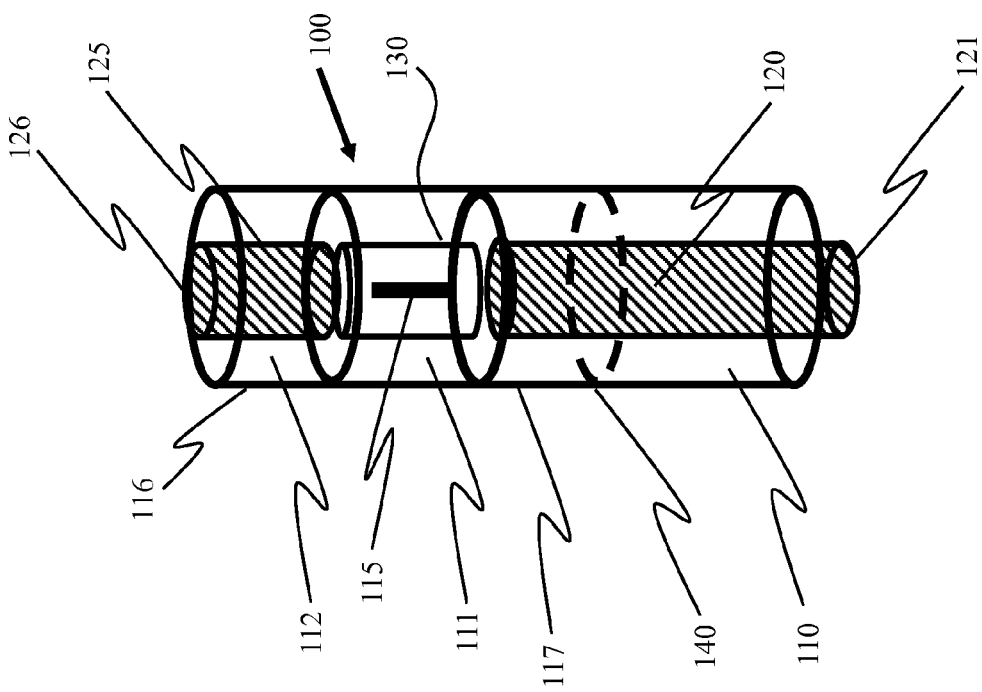
FIG. 8A is a simplified perspective view of an integrated bulb/output coupling element assembly comprising multiple sections including an output coupling element, a gas-fill vessel that is the bulb, and top coupling-element according to an embodiment of the present invention. The output coupling-element and top coupling-element are solid electrical conductors.

FIG. 8B is a side-cut view of an integrated bulb/output coupling-element assembly 100 shown in FIG. 8A. This diagram is merely an example, which should not unduly limit the scope of the claims herein. One of ordinary skill in the art would recognize other variations, modifications, and alternatives. The assembly can be made from a single piece of material such as a hollow quartz tube or translucent alumina, or it can be made from three different pieces and assembled together.

Figure 8C:
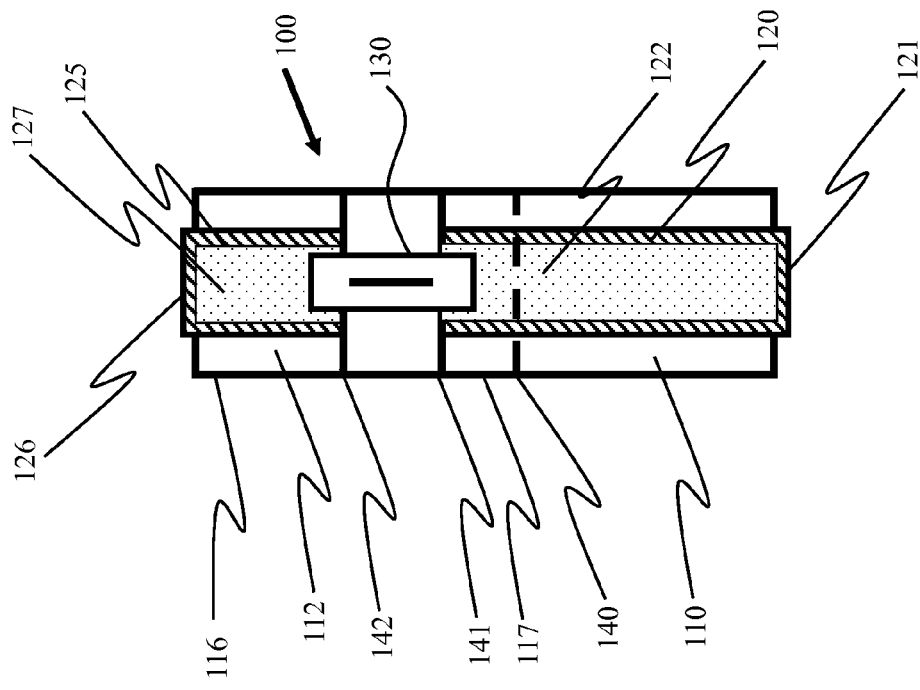
FIG. 8C is a simplified perspective view of an alternate integrated bulb/output coupling-element assembly comprising multiple sections including an output coupling-element, a gas-fill vessel that is the bulb, and a top coupling-element according to an embodiment of the present invention. The output coupling-element and top coupling-element are of conductively-coated dielectric material.

FIG. 8C is a perspective view of an alternative design for an integrated bulb/output coupling-element assembly 100. This diagram is merely an example, which should not unduly limit the scope of the claims herein. One of ordinary skill in the art would recognize other variations, modifications, and alternatives. The assembly is similar to FIG. 8A except that the output coupling-element 120 and top coupling-element 125 are made using a conductive coated dielectric instead of a solid conductor. The bulb assembly comprises three sections 110, 111, and 112 which can be made separately from different materials and integrated together or can be made from a single piece such as a hollow tube of quartz or translucent alumina. The output coupling-element 120 consists of a dielectric post 122 made from a material such as alumina with its outer surface coated with a conductive veneer such as silver. The body 110 is bored to receive the output coupling-element 120. The top coupling-element 125 also consists of a dielectric post 127 made from a material such as alumina with its outer surface coated with a conductive veneer such as silver. It is a key invention that dielectric posts of the output coupling-element 120 and top coupling-element 125 are bored to closely receive bulb 130, such that heat transfer through their dielectric centers and RF coupling through their conductive outer coatings take place simultaneously. The areas of the dielectric posts of output coupling-element and top coupling-element that come in contact with the bulb are not covered with a conductive veneer. Using this bulb assembly approach the high RF fields are kept away from the ends of bulbs resulting in a more reliable lamp. It is also a key aspect of this invention that output coupling-element 120 and top coupling-element 125 make ground contact at planes 121 and 126 respectively with the lamp body 600 depicted in FIGS. 7A, 7B, and 7C.

The portion of body 110 that is received by the lamp body 600 as depicted in FIGS. 7A, 7B, and 7C (and overlaps with the length of input coupling-element 630) and is shown in FIG. 8C as being below the dashed line 140; is not coated with a conductive layer. The portion of body 110 that is above the lamp body 600 but substantially below the bulb 130 is depicted schematically as the area between 140 and 141; this portion may be coated with a conductive veneer. The portion of body 110 that is substantially above the bulb 130 is depicted as that area above line 142; this portion may also be coated with a conductive veneer 116. The purpose of the conductive coatings is to shield against unwanted electromagnetic radiation. An example embodiment of conductive veneers 116 and 117 is silver paint. Alternatively, instead of conductive veneers portion of the lower section 110 can be covered by a metal ring 650 as part of the extension of lamp body 600 as depicted in FIG. 9. The outer surface of the mid section 111 is not coated.

Figure 8D:
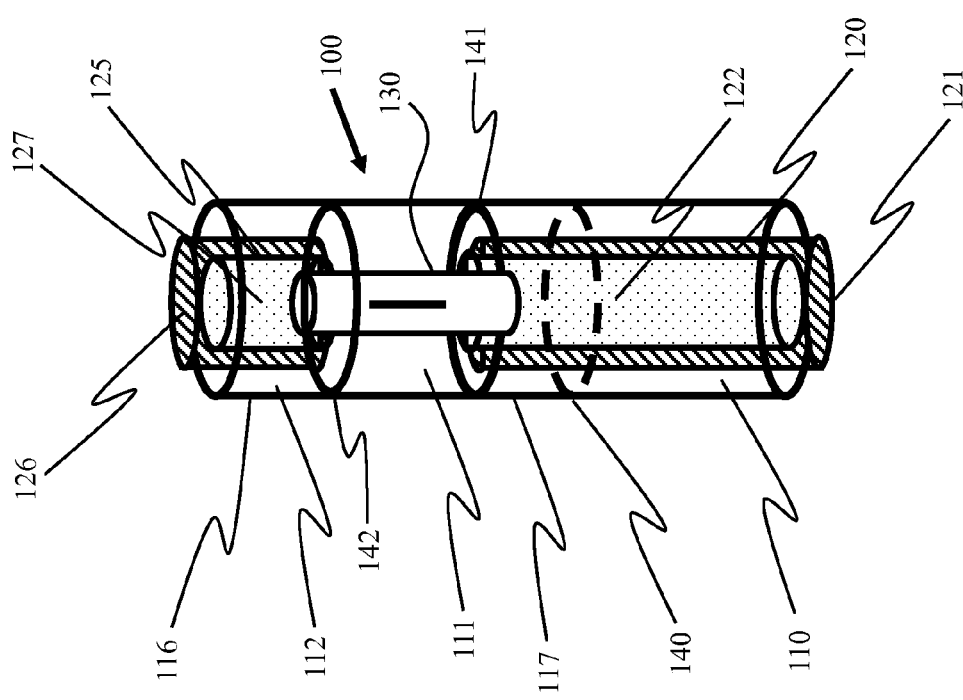
FIG. 8D is a simplified side-cut view of the alternate integrated bulb/output coupling-element assembly shown in FIG. 8C comprising multiple sections including an output coupling-element, a gas-fill vessel that is the bulb, and a top coupling-element according to an embodiment of the present invention. The output coupling-element and top coupling-element are of conductively-coated dielectric material.

FIG. 8D is a side-cut view of an integrated bulb/output coupling-element assembly 100 shown in FIG. 8C. This diagram is merely an example, which should not unduly limit the scope of the claims herein. One of ordinary skill in the art would recognize other variations, modifications, and alternatives. The assembly can be made from a single piece of material such as a hollow quartz tube or translucent alumina, or it can be made from three different pieces and assembled together.

Figure 8F:
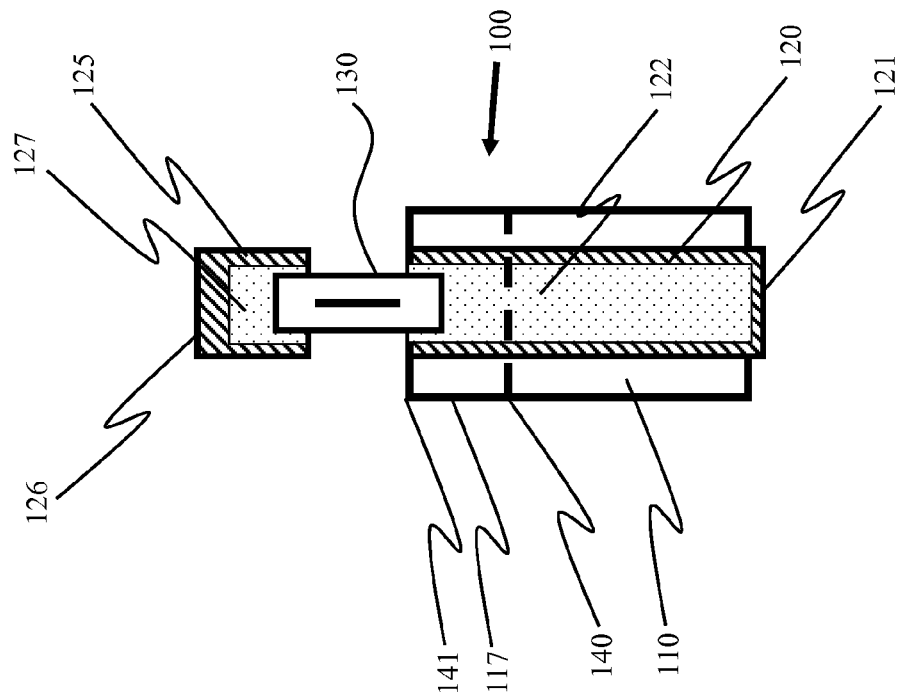
FIG. 8F is a simplified side-cut view of the alternate integrated bulb/output coupling-element assembly shown in FIG. 8E comprising multiple sections including an output coupling-element, a gas-fill vessel that is the bulb, and a top coupling-element according to an embodiment of the present invention. The output coupling-element and top coupling-element are of conductively-coated dielectric material.
Figure 8E:
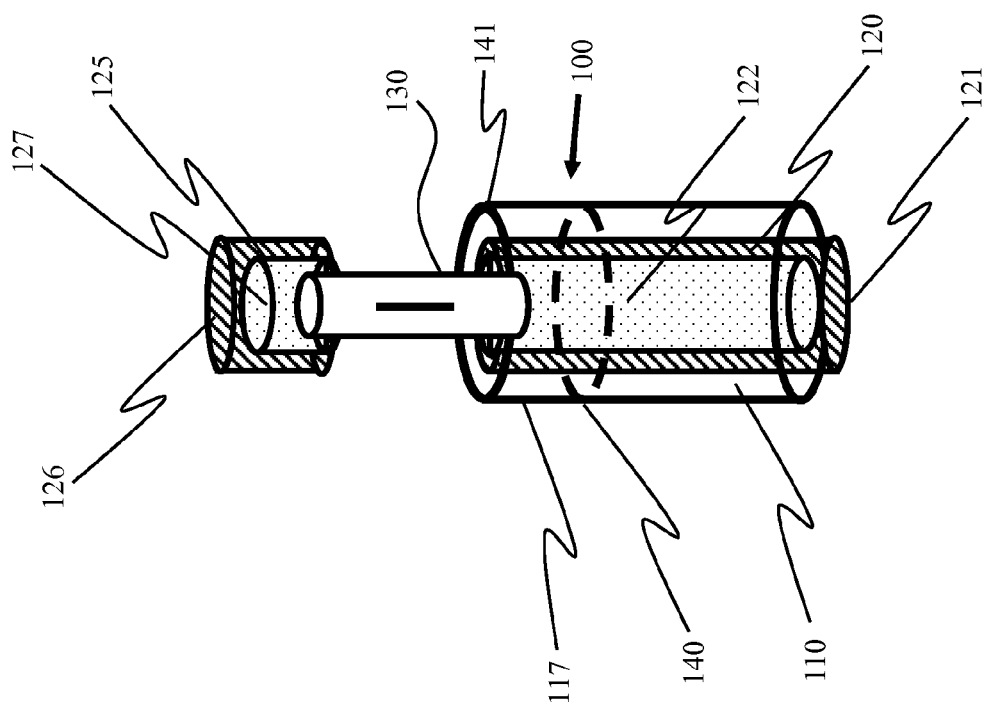
FIG. 8E is a simplified perspective view of an alternate integrated bulb/output coupling-element assembly comprising multiple sections including an output coupling-element, a gas-fill vessel that is the bulb, and a top coupling-element according to an embodiment of the present invention. The output coupling-element and top coupling-element are of conductively-coated dielectric material.

FIG. 8E is a perspective view of an alternative design for an integrated bulb/output coupling-element assembly 100. This diagram is merely an example, which should not unduly limit the scope of the claims herein. One of ordinary skill in the art would recognize other variations, modifications, and alternatives. The assembly is similar to FIG. 8C except that the middle section and top section of the assembly are not inside a dielectric tube such as a quartz tube. The assembly consists of three sections. The bottom section 110 is identical to FIG. 8C and it contains the output coupling-element 120 which consists of a dielectric post 122 made from a material such as alumina with its outer surface coated with a conductive veneer such as silver. The middle section consists of the bulb (gas-fill vessel) 130 which is made from a material that is transparent to visible light such as quartz or translucent alumina. The top section consists of the top coupling-element 125 which also consists of a dielectric post 127 made from a material such as alumina with its outer surface coated with a conductive veneer such as silver. It is a key invention that dielectric posts of the output coupling-element 120 and top coupling-element 125 are bored to closely receive bulb 130, such that heat transfer through their dielectric centers and RF coupling through their conductive outer coatings take place simultaneously. The areas of the dielectric posts of output coupling-element and top coupling-element that come in contact with the bulb are not covered with a conductive veneer. Using this bulb assembly approach the high RF fields are kept away from the ends of bulbs resulting in a more reliable lamp. It is also a key aspect of this invention that output coupling-element 120 and top coupling-element 125 make ground contact at planes 121 and 126 respectively with the lamp body 600 depicted in FIGS. 7A, 7B, and 7C.

The portion of body 110 that is received by the lamp body 600 as depicted in FIGS. 7A, 7B, and 7C (and overlaps with the length of input coupling-element 630) and is shown in FIG. 8E as being below the dashed line 140; is not coated with a conductive layer. The portion of body 110 that is above the lamp body 600 but substantially below the bulb 130 is depicted schematically as the area between 140 and 141; this portion may be coated with a conductive veneer 117. The purpose of the conductive coatings is to shield against unwanted electromagnetic radiation. An example embodiment of conductive veneers 117 is silver paint. Alternatively, instead of conductive veneers portion of the lower section 110 can be covered by a metal ring 650 as part of the extension of lamp body 600 as depicted in FIG. 9.

FIG. 8F is a side-cut view of an integrated bulb/output-element assembly 100 shown in FIG. 3D. This diagram is merely an example, which should not unduly limit the scope of the claims herein. One of ordinary skill in the art would recognize other variations, modifications, and alternatives. It is similar to the assembly shown in FIG. 8E except that the middle and top sections of the assembly are not within a dielectric tube made from a material such as quartz.

FIG. 8G is a perspective view of an alternative design for an integrated bulb/output coupling-element assembly 100. This diagram is merely an example, which should not unduly limit the scope of the claims herein. One of ordinary skill in the art would recognize other variations, modifications, and alternatives. The assembly is similar to FIG. 8E except that there is no top coupling-element. The assembly consists of two sections. The bottom section 110 is identical to FIG. 8E and it contains the output coupling-element 120 which consists of a dielectric post 122 made from a material such as alumina with its outer surface coated with a conductive veneer such as silver. The top section consists of the bulb (gas-fill vessel) 130 which is made from a material that is transparent to visible light such as quartz or translucent alumina. It is a key aspect of the invention that dielectric post of the output coupling-element 120 is bored to closely receive bulb 130, such that heat transfer through its dielectric center and RF coupling through its conductive outer coating take place simultaneously. The area of the dielectric post of the output coupling-element that come in contact with the bulb is not covered with a conductive veneer. Using this bulb assembly approach the high RF fields is kept away from the end of bulb resulting in a more reliable lamp. It is also a key aspect of this invention that output coupling-element 120 makes ground contact at plane 121 with the lamp body 600 depicted in FIGS. 2A, 2B, and 2C.

The portion of body 110 that is received by the lamp body 600 as depicted in FIGS. 7A, 7B, and 7C (and overlaps with the length of input coupling-element 630) and is shown in FIG. 8G as being below the dashed line 140; is not coated with a conductive layer. The portion of body 110 that is above the lamp body 600 but substantially below the bulb 130 is depicted schematically as the area between 140 and 141; this portion may be coated with a conductive veneer 117. The purpose of the conductive coatings is to shield against unwanted electromagnetic radiation. An example embodiment of conductive veneer 117 is silver paint. Alternatively, instead of a conductive veneer, portion of the body 110 between 140 and 141 can be covered by a metal ring 650 as part of the extension of lamp body 600 as depicted in FIG. 9.

FIG. 8H is a side-cut view of an integrated bulb/output coupling-element assembly 100 shown in FIG. 8G. This diagram is merely an example, which should not unduly limit the scope of the claims herein. One of ordinary skill in the art would recognize other variations, modifications, and alternatives. The assembly is similar to FIG. 8F except that there is no top coupling-element.

FIG. 9 is a perspective view of the lamp body/metallic enclosure of the lamp shown in FIGS. 7A, 7B, and 7C. This diagram is merely an example, which should not unduly limit the scope of the claims herein. One of ordinary skill in the art would recognize other variations, modifications, and alternatives. The lamp body/metallic enclosure consists of two sections a bottom section 600 and a top section 650. The bottom section of the lamp body is cylindrical in this case but it also can be made in rectangular or other shapes as well. The top portion of the lamp body is in the form of a metallic ring but it can be in the form of a rectangle/square as well. The lamp body is made from a metal such as aluminum or copper. The lamp body can be made from multiple pieces and attached together using screws or by soldering or welding or other techniques. Inside of the lamp body 638 is hollow and it receives the integrated bulb/output coupling-element assembly 100 (FIGS. 8A, 8C, and 8E) through holes 610 and 510. The output coupling-element 120 and top coupling-element 125 are electrically connected to the lamp body which is connected to ground. There are also holes in the lamp body 611 and 612 to receive the input coupling-element 630 and the feedback coupling-element 635 shown in FIGS. 7A, 7B, and 7C. The two coupling-elements will not touch the walls of lamp body at the bottom. However, the input coupling-element 630 will protrude through the hole 731 at the top surface of lamp body 600 and connects to the lamp body which is connected to ground.

Figure 10A:
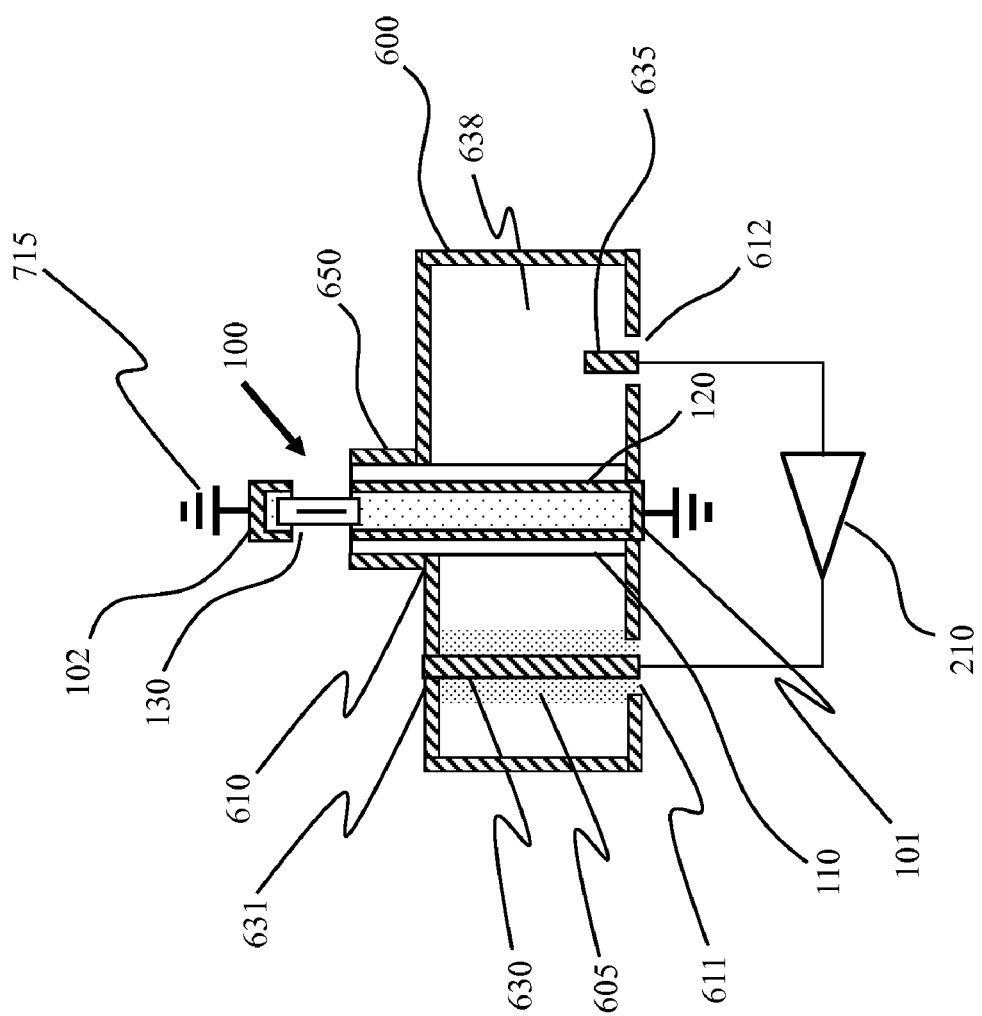
FIG. 10A is a simplified side cut view of an alternate electrodeless lamp design, employing the conductive lamp body shown in FIG. 9 and the integrated bulb/output coupling-element assembly shown in FIG. 8D according to an embodiment of the present invention. The inside of lamp body is filled with air and a dielectric layer is used around the input coupling-element to prevent arcing.

FIG. 10A is a side cut view of an alternate electrodeless lamp design, employing the lamp body/metallic enclosure shown in FIG. 9 and the integrated bulb/output coupling-element assembly shown in FIG. 8E. This diagram is merely an example, which should not unduly limit the scope of the claims herein. One of ordinary skill in the art would recognize other variations, modifications, and alternatives. The inside of lamp body 638 is substantially hollow. A dielectric layer 605 such as Teflon is used around the input coupling-element 630 to prevent arcing. The end of the input coupling-element 631 is connected to the lamp body which is connected to ground. The lamp assembly is also connected to ground at planes 101 and 102. The lower section of the lamp assembly 110 which is inside lamp body 600 is not covered with any metal. This allows RF energy to be coupled from the input coupling-element 630 to the output coupling-element 120. The coupling and the impedance match to the bulb depends on the separation between the two coupling-elements and their dimensions including length and diameter. The resonant frequency of the lamp body and lamp assembly is strongly dependent on the length of the output coupling-element and is less dependent on the diameter of the cylindrical lamp body. Feedback coupling-element 635 is closely received by the lamp body 600 through opening 612, and as such is not in direct DC electrical contact with the lamp body 600. The shorter feedback E-field coupling-element 635 couples a small amount of RF energy from the bulb/coupling-element assembly 100 and provides feedback to the RF amplifier 210. While the configuration shown in FIG. 10A is a feedback configuration similar to FIG. 7A it is also possible to implement this design using a no-feedback configuration similar to FIG. 2B.

Figure 10B:
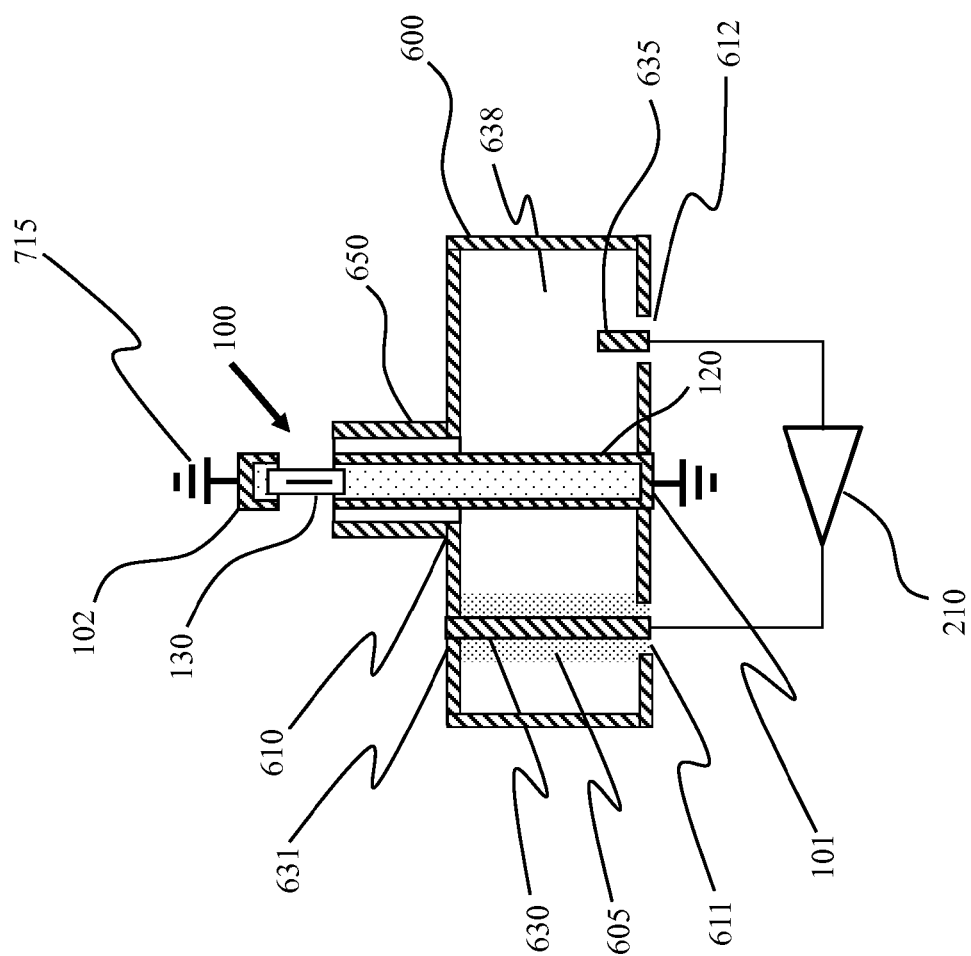
FIG. 10B is a simplified side cut view of a modified lamp design shown in FIG. 10A. Part of the dielectric layer around the output coupling-element of the bulb assembly has been removed according to an embodiment of the present invention.

FIG. 10B is a side cut view of an alternate electrodeless lamp design to the one shown in FIG. 10A. This diagram is merely an example, which should not unduly limit the scope of the claims herein. One of ordinary skill in the art would recognize other variations, modifications, and alternatives. This design is similar except part of the dielectric layer 110 (such as a quartz tube) shown in FIG. 10A surrounding the output coupling-element 120 inside the bottom section of the lamp body 600 has been removed.

Figure 10C:
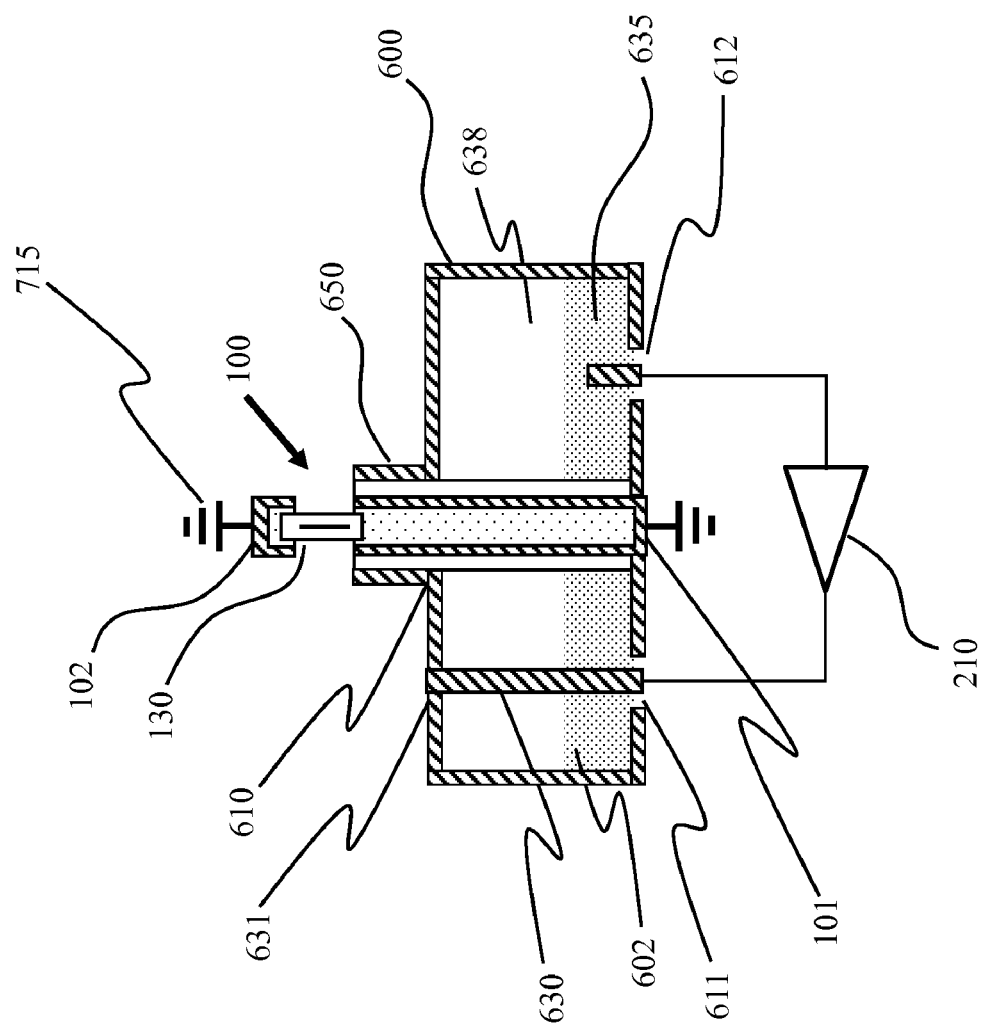
FIG. 10C is a simplified side cut view of an alternate lamp design shown in FIG. 10A. The lower part of the lamp body is partially filled with dielectric according to an embodiment of the present invention.

FIG. 10C is a side cut view of an alternate electrodeless lamp design to the one shown in FIG. 10A. This diagram is merely an example, which should not unduly limit the scope of the claims herein. One of ordinary skill in the art would recognize other variations, modifications, and alternatives. This design is similar except that the lamp body 600 is partially filled with dielectric 602 in the lower part of the lamp body.

Figure 10D:
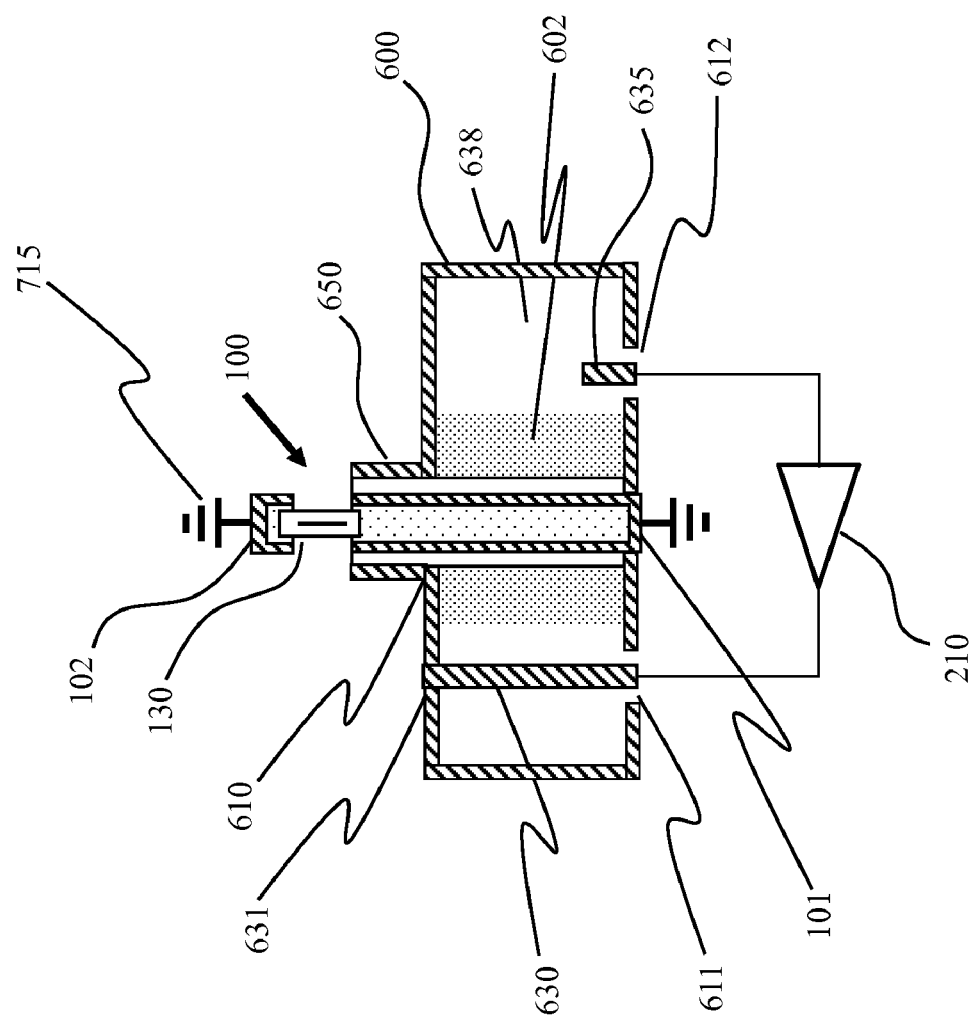
FIG. 10D is a side cut view of an alternate lamp design shown in FIG. 10A. The lower part of the lamp body is partially filled with dielectric according to an embodiment of the present invention.

FIG. 10D is a side cut view of an alternate lamp design to the one shown in FIG. 10C. This diagram is merely an example, which should not unduly limit the scope of the claims herein. One of ordinary skill in the art would recognize other variations, modifications, and alternatives. This design also has a lamp body 600 that is partially filled with dielectric except in this case the dielectric layer is cylindrical surrounding the output coupling-element of lamp assembly. It is also possible that the lamp body is completely filled with a dielectric.

It is shown through electromagnetic simulation that the two significant advantages of the lamp design depicted in FIGS. 7A and 7B—namely, that the resonant frequency is strongly dependent on the relative lengths of the input and output coupling-elements while being very weakly dependent on the dimensions or dielectric properties of the lamp body 600 or its dielectric insert 602, and that the RF power coupled to the bulb 130 is strongly dependent on the physical separation between the input coupling-element 630 and the output coupling-element within the bulb/output coupling-element assembly 100—are retained in the design depicted in FIGS. 9A and 9B. It can also be appreciated by one of ordinary skill in the art that the distributed RF oscillator configuration depicted in FIGS. 9A and 9B—involving a feedback coupling-element 635, and amplifier 210, and an input coupling-element 630 forming a positive feedback loop around the bulb/output coupling-element assembly 100, similar to that configuration depicted in FIG. 7A—can be substituted with the lumped RF source configuration depicted in FIG. 7B with no substantive change to the invention.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for converting a low or high pressure sodium street lamp to an electrode-less lamp device, the method comprising:
   providing a street lamp apparatus comprising a first housing having an inner region and an outer region, the inner region forming a cavity structure, a transparent cover coupled to the housing to enclose the inner region, a socket being provided within the cavity structure, the socket being coupled to a sodium lamp having a first terminal and a second terminal, a ballast being coupled to the first terminal and an AC power source coupled between the ballast and the second terminal;
   removing the first housing from the street lamp apparatus by at least decoupling an AC power source and mechanically decoupling the first housing from the street lamp apparatus;
   attaching a second housing to the street lamp apparatus, the second housing comprising a plasma lamp device coupled to a resonator structure, the resonator structure coupled to an rf power source;
   coupling the AC power source to the rf power source; and
   supplying the power from the AC power source to the plasma lamp,
   wherein the plasma lamp comprises:
   a conductive housing having a spatial volume defined within the conductive housing, the spatial volume having an inner region and an outer region;
   a gas-filled vessel having a transparent or translucent body having an inner surface and an outer surface and a cavity formed within the inner surface, the gas filled vessel comprising a first end region and a second end region and a length defined between the first end region and the second end region;
   a first coupling-element spatially disposed within the inner region of the conductive housing coupled to the first end region of the gas-filled vessel, the other end of the first coupling-element being electrically connected to the conductive housing;
   an RF source coupling-element spatially disposed within the outer region of the conductive housing and within a predetermined distance from the first coupling-element, one end of the RF source coupling-element being electrically connected to the conductive housing;

a gap provided between the RF source coupling-element and the first coupling-element, the gap being formed by the predetermined distance;

an RF source comprising an output, the output of the RF source being coupled to the first coupling-element through the gap and the RF source coupling-element.

2. The method of claim 1 wherein the second housing comprises a conductive material.

3. The method of claim 1 wherein the second housing comprises a portion configured as a heat sink for the rf power source.

4. The method of claim 1 wherein the second housing comprises a cavity region comprising the reflector material.

5. The method of claim 1 wherein the plasma lamp comprises a fill material, the fill material being capable of discharging substantially white light.

6. The method of claim 1 wherein the street lamp apparatus comprises a pole structure and a base.

7. The method of claim 1 wherein the rf power source is disposed within the second housing operably coupled to the plasma lamp.

8. A method for converting a street lamp comprising:

providing a cobra head lamp apparatus including at least a high pressure sodium or mercury lamp device;

opening an internal region of the cobra head lamp apparatus;

removing at least a reflector device, the high pressure sodium or mercury lamp device, and a ballast device from the cobra head lamp apparatus;

coupling a self contained plasma lamp assembly including a plasma lamp, a resonator, an RF driver, and a heat sink into the internal region of the cobra head lamp apparatus; and connecting the self contained plasma lamp assembly to an electrical connection, wherein the plasma lamp comprises:

a conductive housing having a spatial volume defined within the conductive housing, the spatial volume having an inner region and an outer region;

a gas-filled vessel having a transparent or translucent body having an inner surface and an outer surface and a cavity formed within the inner surface, the gas filled vessel comprising a first end region and a second end region and a length defined between the first end region and the second end region;

a first coupling-element spatially disposed within the inner region of the conductive housing coupled to the first end region of the gas-filled vessel, the other end of the first coupling-element being electrically connected to the conductive housing;

an RF source coupling-element spatially disposed within the outer region of the conductive housing and within a predetermined distance from the first coupling-element, one end of the RF source coupling-element being electrically connected to the conductive housing;

a gap provided between the RF source coupling-element and the first coupling-element, the gap being formed by the predetermined distance;

an RF source comprising an output, the output of the RF source being coupled to the first coupling-element through the gap and the RF source coupling-element.

9. The method of claim 8 wherein the coupling of the self contained plasma lamp assembly is disposed on a frame region of the cobra head lamp apparatus.

10. The method of claim 8 wherein the coupling of the self contained plasma lamp assembly is disposed within a cavity region of the internal region of the cobra head lamp apparatus.

11. The method of claim 8 wherein the connecting comprises attaching at least one lead to a terminal block coupled to power lines in the cobra head housing.

12. The method of claim 8 wherein the opening comprises separating a frame region coupled to a reflector device to expose a cavity region of the cobra head lamp.

13. The method of claim 8 wherein the self contained light assembly is a plasma light engine.

14. The method of claim 8 further comprising securing the plasma lamp assembly to the cobra head lamp apparatus.

* * * * *